(12) United States Patent
Brown

(10) Patent No.: US 9,038,620 B2
(45) Date of Patent: May 26, 2015

(54) CONVERTIBLE MOBILE FIRE PIT AND COOKER ASSEMBLY

(76) Inventor: Lawrence Stephen Brown, Johnson City, TN (US)

( * ) Notice: Subject to any disclaimer, the term of this patent is extended or adjusted under 35 U.S.C. 154(b) by 491 days.

(21) Appl. No.: 13/507,256

(22) Filed: Jun. 15, 2012

(65) Prior Publication Data

US 2012/0318255 A1   Dec. 20, 2012

Related U.S. Application Data

(60) Provisional application No. 61/498,338, filed on Jun. 17, 2011.

(51) Int. Cl.
| | |
|---|---|
| *F23B 20/00* | (2006.01) |
| *F23G 5/40* | (2006.01) |
| *A47J 37/07* | (2006.01) |
| *F24B 1/02* | (2006.01) |

(52) U.S. Cl.
CPC . *F23B 20/00* (2013.01); *F23G 5/40* (2013.01); *A47J 37/0763* (2013.01); *F24B 1/022* (2013.01); *A47J 37/0704* (2013.01); *A47J 2037/0795* (2013.01)

(58) Field of Classification Search
CPC ......... F23G 2203/60; F23G 5/40; F23G 5/42; F23B 20/00; A47J 2037/0777; A47J 37/0763; F24B 1/181; F24B 1/022
USPC ......................................................... 110/241
See application file for complete search history.

(56) References Cited

U.S. PATENT DOCUMENTS

| | | |
|---|---|---|
| 3,224,357 A | 12/1965 | Rubens |
| 3,455,291 A | 7/1969 | Glass |
| 4,233,890 A | 11/1980 | Jansen |
| 4,467,709 A | 8/1984 | Anstedt |
| 4,495,860 A | 1/1985 | Hitch et al. |
| 4,512,249 A | 4/1985 | Mentzel |
| 4,721,037 A | 1/1988 | Blosnich |
| 4,962,696 A | 10/1990 | Gillis |
| 5,094,223 A | 3/1992 | Gonzalez |
| 5,184,599 A | 2/1993 | Stuart |
| 5,359,923 A | 11/1994 | Boswell |
| 5,531,154 A | 7/1996 | Perez, III |
| 5,564,330 A | 10/1996 | Nowicke, Sr. |
| 5,596,980 A * | 1/1997 | Whalen et al. ................. 126/519 |
| 5,598,834 A * | 2/1997 | Grady ........................... 126/506 |
| 5,653,162 A | 8/1997 | Lunde |
| 5,755,151 A | 5/1998 | Nowicke, Sr. |
| 5,768,977 A | 6/1998 | Parris et al. |
| 5,832,915 A * | 11/1998 | Skidmore et al. ............. 126/9 R |
| 5,836,298 A * | 11/1998 | Grady ........................... 126/506 |
| 5,865,099 A | 2/1999 | Waugh |

(Continued)

*Primary Examiner* — David J Laux
(74) *Attorney, Agent, or Firm* — Mark L. Davis

(57) ABSTRACT

A multi-sided, portable outdoor fireplace convertible to an open grill, a rotisserie assembly, and a smoker assembly, the fireplace includes a carriage assembly with a pair of rotatable wheels and at least one leg member; a base pan assembly for containing a solid fuel heat source affixed to the carriage assembly; and a removable screen assembly residing on top of the base pan assembly. When converted to an open grill, the fireplace further includes a grill bracket removably attachable to the screen assembly. When converted to a smoker, the fireplace, in one embodiment, further includes at least one heat/wind shield attachable to the screen assembly; a smoker adaptor body residing on the screen assembly; an adjustable grate support bracket affixed to the interior of the smoker body and a cover.

39 Claims, 24 Drawing Sheets

(56) References Cited

U.S. PATENT DOCUMENTS

| | | | |
|---|---|---|---|
| 5,960,788 A * | 10/1999 | Bach et al. | 126/506 |
| 6,016,797 A | 1/2000 | Nowicke, Jr. | |
| 6,220,240 B1 * | 4/2001 | Grady et al. | 126/519 |
| 6,286,503 B1 * | 9/2001 | Bach et al. | 126/519 |
| 6,289,795 B1 | 9/2001 | McLemore et al. | |
| D451,989 S * | 12/2001 | Ashton et al. | D23/343 |
| D460,893 S | 7/2002 | Rowe | |
| 6,439,225 B2 | 8/2002 | Bach et al. | |
| D476,405 S * | 6/2003 | Dunlap | D23/348 |
| 6,626,090 B2 | 9/2003 | McLemore et al. | |
| 6,748,939 B1 | 6/2004 | Gober | |
| 6,755,188 B2 * | 6/2004 | Skidmore et al. | 126/25 R |
| 6,802,312 B1 * | 10/2004 | Kuelbs | 126/519 |
| 6,851,423 B2 * | 2/2005 | Klemming | 126/506 |
| 6,913,011 B1 | 7/2005 | Snider | |
| 6,962,106 B2 | 11/2005 | Viraldo | |
| 7,383,836 B2 | 6/2008 | Klemming | |
| 7,703,386 B1 | 4/2010 | Bourgeois et al. | |
| 7,832,330 B1 | 11/2010 | Thompson | |
| 7,934,494 B1 | 5/2011 | Schneider | |
| 2001/0032642 A1 * | 10/2001 | Bach et al. | 126/519 |
| 2002/0185122 A1 * | 12/2002 | Bossler | 126/519 |
| 2003/0106548 A1 * | 6/2003 | Tseng | 126/506 |
| 2005/0121018 A1 | 6/2005 | Rosen | |
| 2005/0126556 A1 * | 6/2005 | Bossler | 126/25 R |
| 2006/0037605 A1 * | 2/2006 | Fitzgerald et al. | 126/519 |
| 2009/0107483 A1 * | 4/2009 | Fitzgerald et al. | 126/519 |
| 2012/0222668 A1 * | 9/2012 | Unger | 126/544 |

* cited by examiner

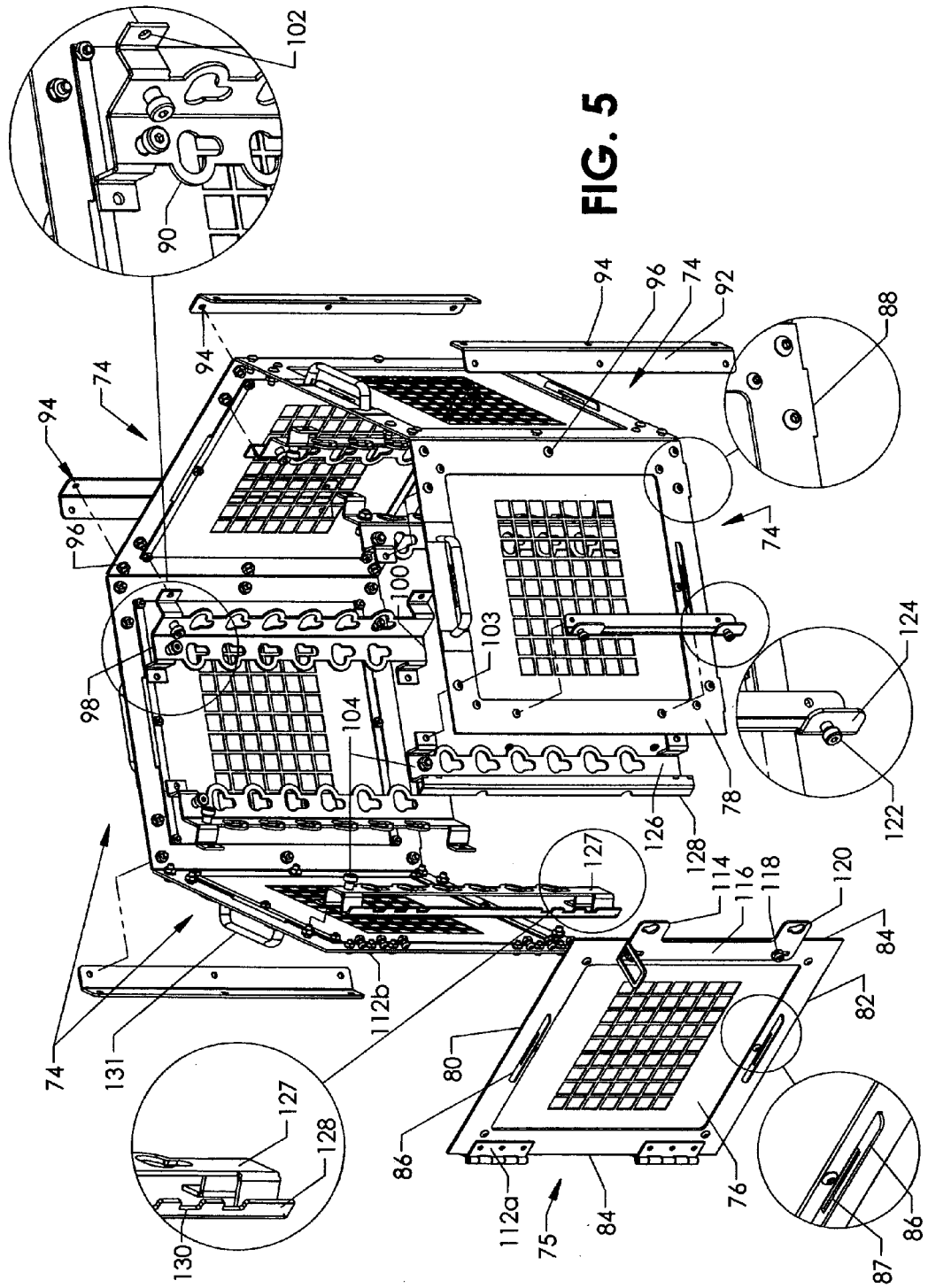

CONVERTIBLE MOBILE FIRE PIT AND COOKER ASSEMBLY

CROSS REFERENCE TO RELATED APPLICATIONS

This application is a non-provisional application claiming benefit to the provisional application having U.S. Ser. No. 61/498,338 filed on Jun. 17, 2011 the entire disclosure of which is incorporated herein by reference.

BACKGROUND OF THE INVENTION

The present invention generally relates to a convertible, mobile apparatus for outdoor use, and particularly, to a convertible, mobile fireplace or heat containment assembly for home or personal entertainment purposes. More particularly, the invention is directed to a mobile fireplace or fire pit assembly that is convertible to a cooker, such as a grill and/or meat smoker, and in one embodiment utilizing as a basic component of the cooker the fireplace assembly. Advantageously, the present invention permits the user to readily, easily and safely convert from one type of use to another without inadvertently contacting and/or extinguishing the heat source while making the conversion.

Recently, many homes have included into their design or remodel an outdoor living space. Such outdoor living spaces typically include at least one of an outdoor fire place or fire pit and a barbecue grill for cooking various foods, such as meats and vegetables. In some instances, such outdoor living space will include both. Fixed outdoor fireplaces generally are constructed of hardscape materials such as stone or brick and are limited as to where they are placed with respect to the proximity of the home and, as one would expect, become permanent and fixed with regard to where it is placed.

Portable outdoor fireplaces have recently entered the market place. Generally, the size of a portable outdoor fireplace is compact, relative to a fixed fireplace, and their structure is such that the portable outdoor fireplace can be readily and easily moved from one location to another either alone or with the assistance of at least one other individual.

Barbecue grills are also available in a variety of types, sizes and shapes. Such grills can utilize charcoal or a gas, natural or propane, as a heat source. Small grills can be used on a table top such as a picnic table, while larger grills generally have integrated into their design wheels, legs and a stand or have a cart assembly that supports them at a comfortable height convenient for cooking food. Some units may have two to four wheels that make unit mobile by an individual.

Meat smokers have recently been introduced into the market that allow an individual to prepare meats that are cooked via a smoking process. Generally, such meat smokers cook the meat at a much lower temperature than a barbecue grill and allow for a greater control of the cooking temperature. Since smoking meat requires a lower heat, longer cooking times are required, sometimes ranging into hours of cooking time. Thus, a meat smoker must address cooking issues that are absent from a typical barbecue grill, such as the addition of fuel and/or flavor chips into the cooker during the smoking process.

Although these types of outdoor appliances are very popular, many consumers prefer to own one or another, but not all three. For some, limited space for using the appliance or storage is the issue, for others the cost. Others may not want to have a substantial portion of their patio or green space occupied by different appliances. Yet another problem is for people who enjoy camping. They may consider taking a fire pit or a grill but will not take both due to space limitations in transporting the appliances and at the camp site.

One could use a fire pit as a cooking grill, but doing so has its disadvantages. For one thing, a fire pit typically has screened sidewalls to contain sparks and embers from leaving the confined space. In many cases, to place food on a grid for cooking, turning or removing when cooked would require the user to reach over the sidewalls; exposing the user to heat, smoke and air borne debris, such as small particles of ash. Secondly, with screened side walls controlling the air flow and heat generation is difficult and presents problems of flare-ups and uneven cooking. This can result in the surface of the food becoming charred but not having the food's interior not reaching a temperature that is safe for consumption, particularly in the case of meat. Yet another problem with using a fire pit as a cooking grill is that the fire pit typically has a low fire bowl for easy viewing of the fire, it is not at a convenient height for cooking. Constant stooping and bending over would be required for food tending. The shallow bowl holding the heat source would also require frequent turning of the food to prevent burning.

Conversely, one could use a cooking grill as fire pit, but this too has its disadvantages. Generally, most cooking grills are at a height that is convenient for cooking and have a bowl deep enough for holding the heat source at an appropriate distance from the food to prevent rapid overexposure and charring of the food. When a traditional grill is used for a fire, those sitting around the fire are not able to watch it very well because the fire sits deep in the bowl. Moreover, when grill is used as a fireplace or fire pit, the lid of the grill must be removed if the fire is to be viewed thereby loosing any heat that could have been directed toward users.

Although there have been attempts to address the problems associated with different uses of a single device, many retain the issues discussed above, such as lack of mobility, inadvertence to contacting the fire, and little or no control over the heat and air intake if used as a fire pit and then a grill to cook food. For example, U.S. Pat. Publication 2005/01265556 discloses a convertible outdoor firepit and cooking grill. The device includes an adjustable pedestal so a user can adjust the height of the bowl depending upon the device's intended use and removable side walls. The lid is configured so that it will engage both the lower bowl in a grill formation or the removable sidewalls in a fire pit configuration. However, the device is not mobile, and adjusting the telescopic pedestal with a fire in operation is dangerous and presents an opportunity for a user to inadvertently come in contact with the heat source, particularly when changing from one use to another.

U.S. Pat. No. 5,598,834 discloses a portable outdoor fireplace having a convertible grill feature. The device has a concave top and bottom members and a fire screen in between. The fire screen has a pair of horizontal support rings and vertical columns which cooperate to define a cylindrical configuration in which multiple screen panels are supported. One of the fire panels is removable from the screen position and adapted to be inserted into the cylindrical frame to form a grilling surface for cooking. The grill portion is mountable in the frame member in only a few positions, low, medium, and high, thereby limiting the available cooking positions of the grill tray. Another problem with this design is that there is not means for controlling the heat or air to the fire when used as a grill which can cause the food to become charred on the outside and undercooked on the inside. Additionally, when one of the screen panels is used as a grilling surface a large portion of the fire is open, exposing the user to inadvertent contact with fire, embers and/or ash particularly when wood is used as a heat source.

U.S. Pat. No. 5,836,298 discloses a portable outdoor fireplace with a screen assembly that is convertible into a cooking grill. The device has a top and a bottom cover members and a fire screen assembly extending vertically between the two cover members. The fire screen assembly has a pair of horizontal support rings and vertical columns which cooperate to define a cylindrical frame in which supports the screen panels between the two cover members. The frame further includes an entrance to the fire bowl by having one or more screen doors which are hinge-mounted to the frame. A separate cooking grate is insertable into the fireplace and held at a pre-selected horizontal orientation by a series of grill supports. The grill supports extend from the frame and from the screen door so that the cooking grate may be supported at different locations within the fireplace.

U.S. Pat. No. 5,960,788 discloses a collapsible, portable outdoor fireplace that is convertible to a cooking grill. The outdoor fireplace has a top and a bottom cover members and a fire screen assembly extending vertically between the two cover members. The fire screen assembly is easily broken down into its constituent parts which are then stored between the top and bottom cover members. When converted to a cooking grill, the cooking grate is supported above the base member by a series of tabs formed on the fire screen assembly posts.

A problem with the design of the '298 and '788 devices is that there is not means for controlling the heat or air to the fire when used as a grill which can cause the food to become charred on the outside and undercooked on the inside. Additionally, when the device is used as a cooking grill the cooking grate is so low that the user must stoop or bend over to tend to the food.

Accordingly, there is still a need for a portable fireplace that can be easily converted to a cooker, such as grill or smoker, that allows the user to easily and safely convert from one use to a different use without sacrificing or compromising the functionality of the intended use.

SUMMARY OF THE INVENTION

In accordance with the present invention, a portable outdoor fireplace is provided that is adapted to be easily and readily converted to a cooker, such as a grill and/or a smoker, in which, in one embodiment, at least a portion of the fire chamber is utilized. The fire place or fire pit includes: a carriage assembly having a pair of wheels and stationary members for stabilizing the unit as a whole; a bottom pan member attached to the carriage assembly; a top cover; and between the bottom pan member and top cover is a screen assembly. The screen assembly includes a plurality of screens panels joined together by a plurality of vertically-oriented panel connecting members. The bottom pan and screen panels in combination define a fire chamber for holding the solid fuel heat source and allow safe viewing of a fire.

Another aspect of the invention is directed to converting the portable fireplace to an outdoor cooker, such as grill or smoker. In this embodiment, the cooker includes the components described above for the fireplace and further includes: at least one wind/heat deflection assembly that is mounted to and covers at least a portion of at least one of the screen panels; at least one cooking grate bracket for holding a typical cooking grate, and/or a pair of rotisserie holding brackets. The cooking grate bracket(s) and the rotisserie holding brackets include a means for engaging at least one of the internal, vertically-oriented panel connecting members thereby allowing the user to adjust the distance at which the cooking grate or rotisserie is from the heat source.

In yet another aspect of the invention, the fireplace and/or grill is easily converted to a smoker. In this embodiment, the smoker includes the components described above for the fireplace and further includes: at least one mountable wind/heat deflection assembly for covering at least a portion of one of the screen panels; and a smoker assembly that removably engages the top portion of the screen panels. The top cover is adapted to cover the side panels and the smoker assembly allowing for a compact unit which simplifies handling and storage of the entire assembly.

It is an object of the present invention to provide a portable outdoor fireplace that is safely and easily converted to a cooker, such as a grill or smoker.

It is another object of the invention to provide a portable outdoor fireplace that has a bottom shell, a top cover and a plurality of screen panels therebetween, wherein the bottom shell and screen panels cooperate to define a fire chamber for holding the solid fuel heat source and allow safe viewing of a fire.

Another object of the present invention is to provide a portable outdoor fireplace that is easily and safely converted to a cooker, such as a grill or smoker, having a bottom shell, a top cover and a plurality of screen panels separating the top and bottom members. The screen panels being supported by a plurality of vertically-oriented column members wherein at least two of the vertically-oriented column members include a plurality of openings that are adapted to receive at least one of a cooking grate bracket and/or a rotisserie holding brackets.

It is another object of the invention to provide a portable outdoor fireplace that is easily and safely converted to a cooker, such as a grill or smoker, the fireplace having a bottom shell, a top cover and a plurality of screen panels separating the top and bottom members, wherein the bottom shell and screen panels cooperate to define a fire chamber for holding the solid fuel heat source and allow safe viewing of a fire, and further having at least one wind/heat deflector for controlling heat generation of the fire and to shield the fire from wind gusts.

These and other objects and advantages of the present invention will become more apparent to those skilled in the art in view of the following description and the accompanying drawings wherein like parts and objects in the several views have similar reference numerals. It is to be understood that the inventive concept is not to be considered limited to the constructions disclosed herein but instead by the scope of the appended claims.

BRIEF DESCRIPTION OF THE FIGURES

FIG. 5 is an exploded view of the screen assembly of FIG. 4.

DETAILED DESCRIPTION OF THE INVENTION

Figure 1:
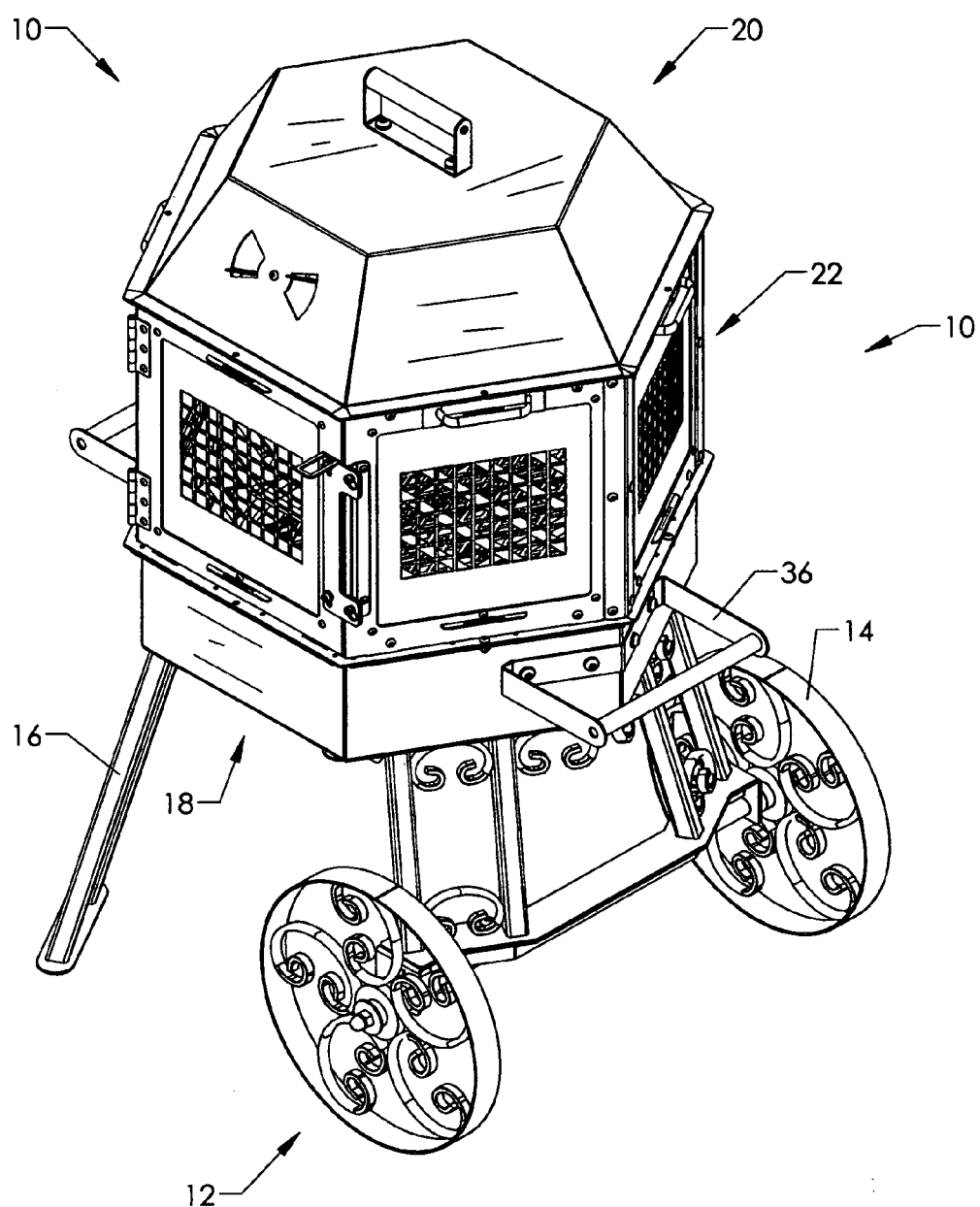
FIG. 1 is an isometric view of the fireplace/fire pit of the present invention.

In accordance with one aspect of the present invention, a portable outdoor fireplace or fire pit is provided that is adapted to be easily and readily converted to a cooker, such as a grill and/or a smoker, in which, in one embodiment, at least a portion of the fireplace is utilized. Referring to FIG. 1, the fireplace is designated as 10. The term "fireplace" and "fire pit" are used interchangeably herein. The fireplace 10 includes: a carriage assembly 12 having a pair of wheels 14 and stationary members or legs 16 for stabilizing the fireplace 10 as a whole; a bottom or base pan assembly 18 for holding a heat source is attached to the carriage assembly 12; a top cover 20; and a screen assembly 22 is positioned between the bottom pan assembly 18 and top cover 20 is adapted to removably engage the bottom pan assembly 18, all of which are described in greater detail hereinafter.

It is to be understood that particular configurations of the fireplace 10 and other embodiments of the invention described herein are illustrated as a hexagonal design are for purposes of example only. One skilled in the art will understand that other suitable configurations having from 3 to 20 sides may be utilized in the present invention.

Fireplace

Figure 2:
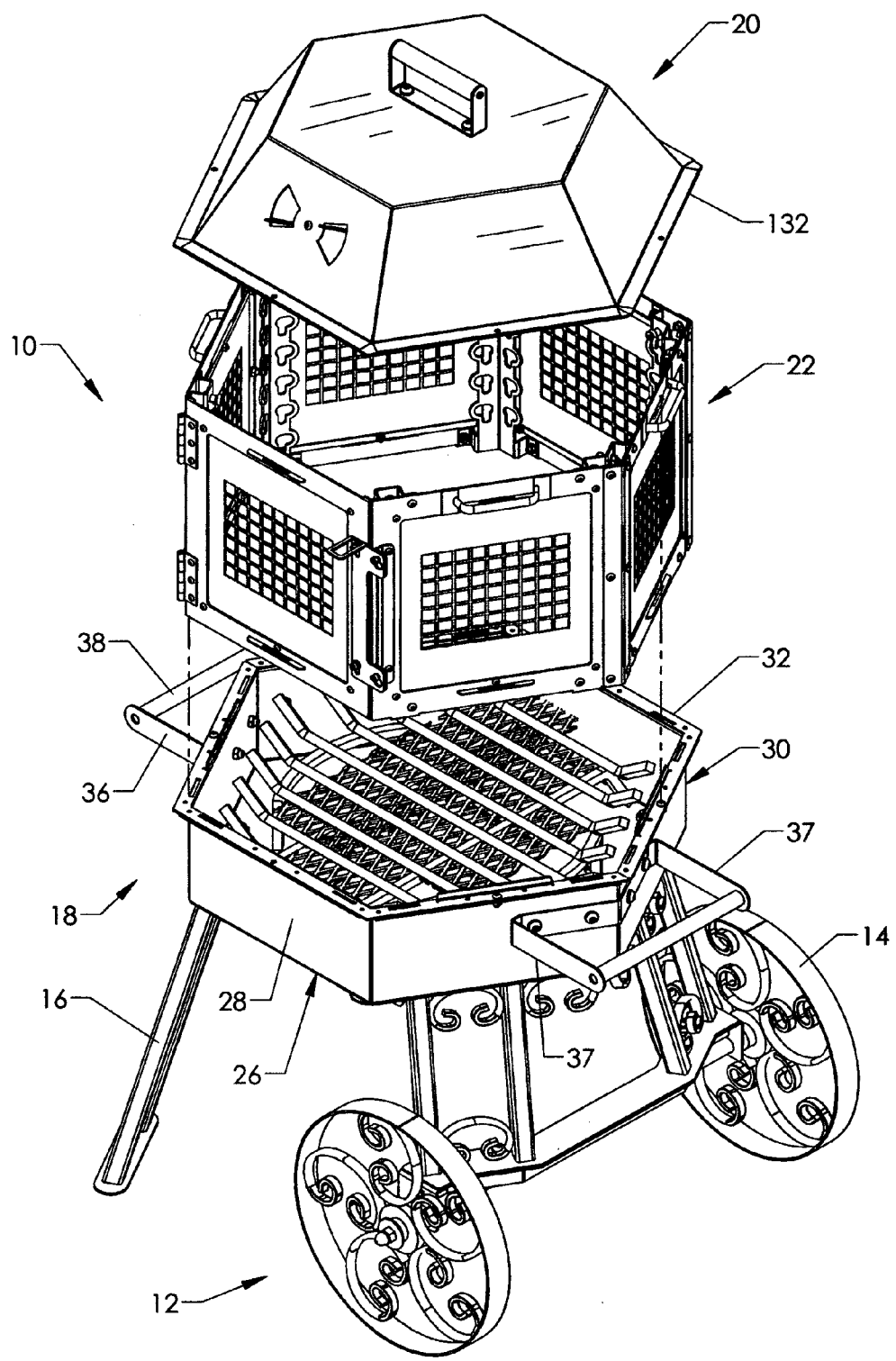
FIG. 2 is an exploded view of the fireplace of FIG. 1 illustrating the carriage assembly supporting the bottom pan member, the screen assembly having a plurality of screens panels connected together by a plurality of vertically-oriented column members, and a top cover.
Figure 2A:
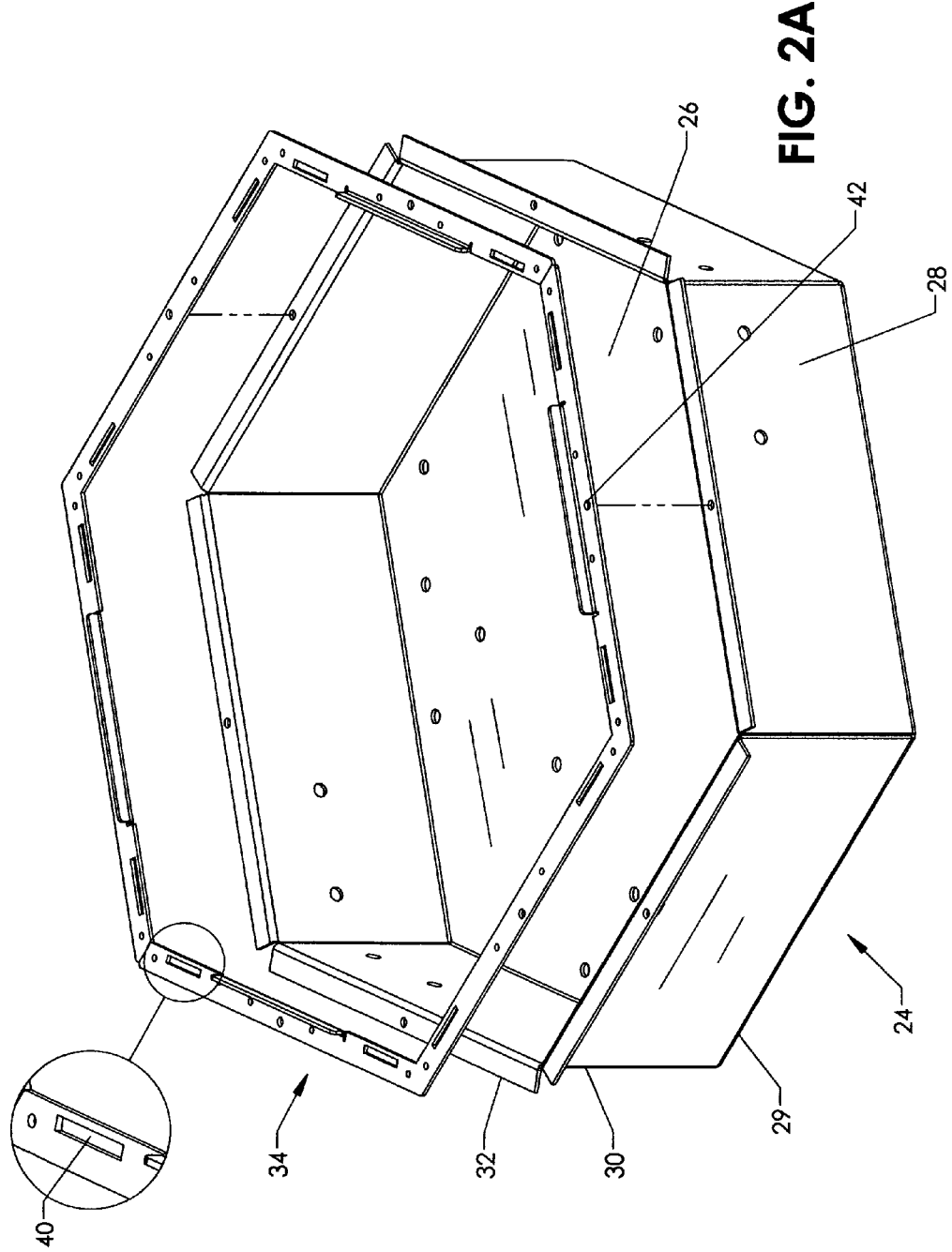
FIG. 2A is an exploded view of the bottom pan member illustrating the basic pan construction and a mating flange utilized to register and secure the screen assembly.

Referring to FIGS. 1 and 2, the base pan assembly 18 of the fireplace 10 has a base pan member 24 that is illustrated as having a substantially flat bottom 26, a plurality of side members 28, each of which have a lower portion 29 and a top portion 30. The lower portion 29 of each side member is affixed to the bottom 26 by any suitable means, such as welding. Alternatively, the base pan member 24 may be constructed from a single piece of suitable gage metal in such a manner that the bottom 26 and sides 28 are one piece with the appropriate cut locations, the sides 28 would then be bent and connected, such as welding, to form the base pan 24. Optionally, the bottom 26 can include an ash pan, i.e., a means for removing ash from the pan base member 24.

The bottom 26 and sides 28 of the base pan member 24 define an enclosure for holding a solid fuel source, such as charcoal, wood or both. Desirably, during use, a wood grate or other suitable device can be used to hold the fuel source off the bottom 26 so as to prevent direct contact of the burning fuel with the bottom 26 and provide a more efficient combustion and uniform heat generation.

The top portion 30 of the pan side 28 can further include an outwardly extending flange 32 for affixing a first mating flange 34 to the top portion 30. The outwardly extending flange 32 and first mating flange 34 can include an alignment means, such as a hole, nib, tab or any other protuberance, generally utilized for alignment of separate parts to facilitate the registration of the top portion of the base pan member 24 with the first mating flange 34. Thereafter, the first mating flange 34 is affixed to the outwardly extending flange 32 by suitable means, such as screwing or bolting together, riveting, adhesives, welding or combinations thereof.

Attached to at least one side 28 of the base pan member 24 is a handle means 36. Desirably, when the fireplace is configured to have five (5) or more sides, the handle means 36 is attached to at least two of the sides 28 of the base pan member 24. The handle means 36 can be attached to the sides 28 by any method known for such joining purposes, such as screwing, bolting, riveting, welding or combinations thereof. The handle means 36 is fabricated from a material that is sufficiently strong to allow the user to move the fireplace to a desired location prior to use, during use, or after use and be capable of withstanding the heat conducted to the handle means 36. Non-limiting examples of such materials include 10-20 gage steel or tempered steel. Desirably, the material is steel having a thickness of from 12-18 gage, with 12-16 gage being preferred. The handle means 36 includes a pair of outwardly extending arms 37 approximately 4 to 10 inches long (10 centimeters to 25 cm) and having a gripping means 38 attached at the terminus of the arms. The gripping means 38 can be fabricated from any suitable material including non or low heat conductive material, such as wood, ceramic, metal or combinations thereof. In one embodiment, the terminus of the arms 37 includes a hole and the gripping means 38 is made from a metal pipe welded to the arms 37 so that the hole in the arm 37 is aligned with the pipe void to allow air communication through the gripping means 38.

Continuing reference to FIGS. 1-2, the first mating flange 34, an important component of the fireplace assembly 10, is generally configured in a shape that corresponds to the shape of the base pan member 24, and can be wider than the outwardly facing flange 32. The first mating flange 34 includes at least one, and preferably at least two through openings or slots 40 per side and also includes a vertical alignment member 42 on at least one side, and preferably at least two sides, the purpose of each being described in greater detail below.

Figure 3:
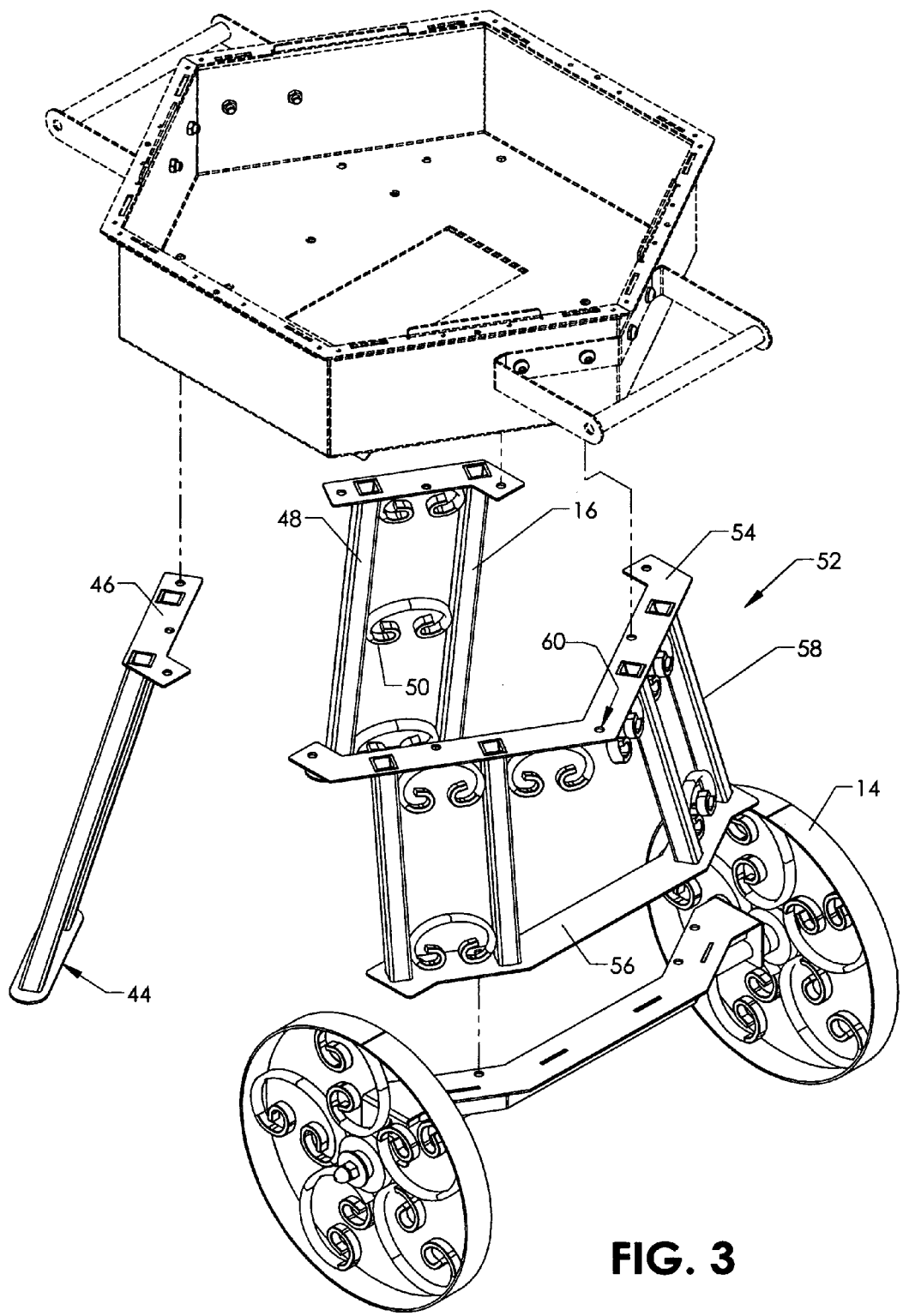
FIG. 3 is a partial plan view of the fireplace illustrating the carriage assembly.
Figure 3A:
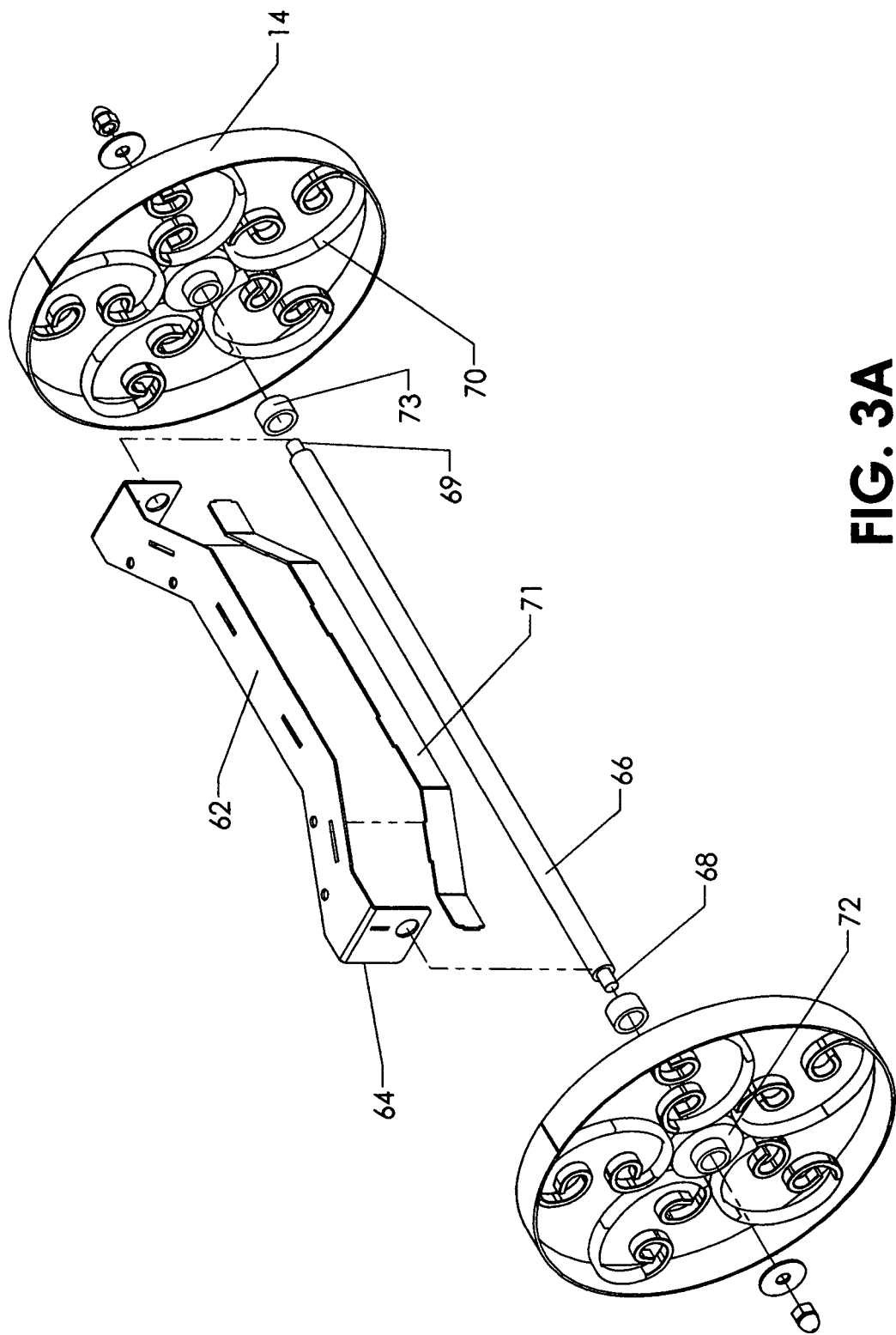
FIG. 3A is an exploded view of the wheel subassembly illustrated in FIG. 3

Referring to FIGS. 1-3, the carriage assembly 12 is partially disposed beneath and connected to the base pan assembly 18 by any suitable means, such as bolts, screws, rivets and the like. The carriage assembly 12 supports the fireplace off the ground and provides mobility to the fireplace. The carriage assembly 12 includes a pair of leg members 16 positioned on one end, designated herein as the front end, of the base pan assembly 18 and preferably on the base pan member 24. Since the carriage assembly 12 includes a pair of leg members 16 only one will be further described. The leg member 16 has a lower, generally flat sole plate 44 that is adapted to level and stabilize the fireplace 10. Distal from the sole plate 44 is a top plate 46 that is connected to the base pan member 24 using screws, bolts, rivets, or is welded.

Joining the sole plate 44 and the top plate 46 are a pair of substantially vertical support members 48. The vertical support members 48 are connected to the sole plate 44 and the top plate 46 by any suitable manner, but welding is preferred. Although the vertical support members 48 are depicted as being fabricated from square stock, the vertical support members 48 can any configuration, including, but not limited to, circular, oval, fluted, angle, flat and the like. The leg member 16 can be extended outwardly relative to the base pan assembly 18 at an angle θ of from about 3 to 45 degrees, and preferably from about 5 to 25 degrees.

To stabilize the vertical support members 48 and prevent torque or twisting of the leg member 16, particularly if the fireplace 10 is set on uneven ground, at least one substantially horizontal cross member 50 connects to and reinforces the two support members 48. The cross member 50 can be of any configuration and is illustrated in FIG. 3 substantially as a scroll or "C" shaped member. The cross member 50 is fastened to each vertical support member 48 by any suitable means known to those skilled in the art, such as by using screws, bolts, rivets, welding or combinations thereof. Although only one cross member 50 may be utilized, aesthetics and design criteria may dictate that more than one or different types or shapes of cross member 50 be utilized.

The carriage assembly 12 also includes a set or pair of wheels 14 connected to a rear leg weldment 52. The weldment 52 includes a top flat bar 54, a bottom flat bar 56 and a pair of short, substantially vertical support leg members 58 joining the two together. The support leg members 58 have a top portion connected to the top flat bar 54 and a distal portion connected to the bottom flat bar 56 by any means known to those skilled in the art. Desirably, the top and distal portions are connected to the top flat bar 54 and the bottom flat bar 56 by welding the pieces together. Although the short, substantially vertical support members 58 are depicted as being fabricated from square stock, the short vertical support members 58 can any configuration, including, but not limited to, circular, oval, fluted, angle, flat and the like.

To stabilize the short, substantially vertical support members 58, at least one substantially horizontal cross member 50 connects and reinforces the two short support members 58. The cross member 50 can be of any configuration and is illustrated in FIG. 3 substantially as a scroll or "C" shaped member. The cross member 50 is fastened to each vertical support member 58 by any suitable means known to those skilled in the art, such as by using screws, bolts, rivets, welding or combinations thereof. Although only one cross member 50 may be utilized, aesthetics and design criteria may dictate that more than one or different types or shapes of cross member 50 be utilized.

Connected to the bottom flat bar 56 is a wheel connector bracket 62. The wheel connector bracket 62 includes a pair of spaced apart, downwardly turned arms 64 positioned on opposing ends of the connector bracket 62. The arms 64 each include a through hole that is used for capturing a wheel axle 66. The wheel axle 66 has a spaced apart ends 68 and 69 and include a means for holding the wheel 14 onto the axle 66. Non-limiting examples of means for holding the wheels 14 onto the axle 66 include a nut and mating threads on the end of the axle 66; and a hole in the ends 68 and 69 that allows a cotter pin or split pin to be inserted therethrough to prevent the wheel 14 from inadvertently dislodging from the axle 66. The bottom flat bar 56 and the wheel connector bracket 62 may be connected using any suitable means such as screws, bolts, rivets, welding and combinations thereof.

The wheels 14 utilized for the carriage assembly 12 can be of any type known to those skilled in the art. Desirably, the wheels 14 have a diameter greater than about 4 inches (10 centimeters) to about 24 inches (61 cm); preferably the wheels 14 have a diameter greater than about 6 inches (15 cm) to about 18 inches (46 cm); and more preferably the wheels 14 have a diameter greater than about 8 inches (20 cm) to about 14 inches (36 cm). The wheels 14 can be constructed from any suitable material, including but not limited to metal, rubber (natural or synthetic) and thermoplastics, such as polyurethane, polybutylterephthalate, polycarbonate, polyethylene, and the like. Desirably, the wheel 14 is constructed from a metal ring having several spoke members 70 welded to a central hub 72 that movably slides over the axle 66. To prevent the hub 72 from slipping too far inward, an axle spacer 73 is placed between the axle hub 72 and the downwardly turned arms 64. Optionally, a wheel plate gusset 71 can be connected to the wheel connecting bracket 62 to add additional strength and rigidity to this part of the carriage assembly 12.

The rear leg weldment 52 is connected to the base pan assembly 18 using any suitable connecting means known to those skilled in the art, such as, screws, bolts, rivets, welding or combinations thereof. Desirably, the top flat bar 54 includes at least one mounting hole 60 that is registered with a mating hole in the bottom of base pan member 28 so that a bolt, rivet or welding connecting means may be used.

Figure 4A:
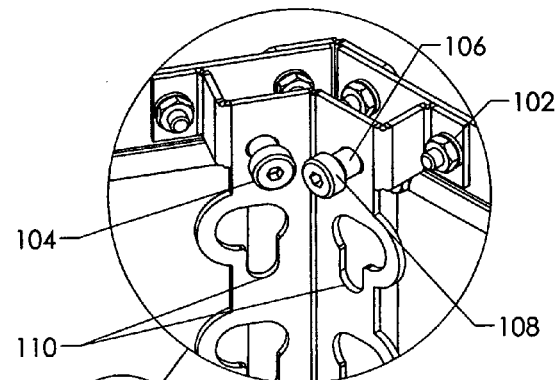
FIG. 4A is an enlarged view of a first portion of FIG. 4 illustrating the structure an internal, vertically-oriented column member connecting two screen members together. The vertically-oriented column member having a plurality of elevation adjustment slots and locking means for receiving a cooking grate bracket or a rotisserie holding bracket.
Figure 4:
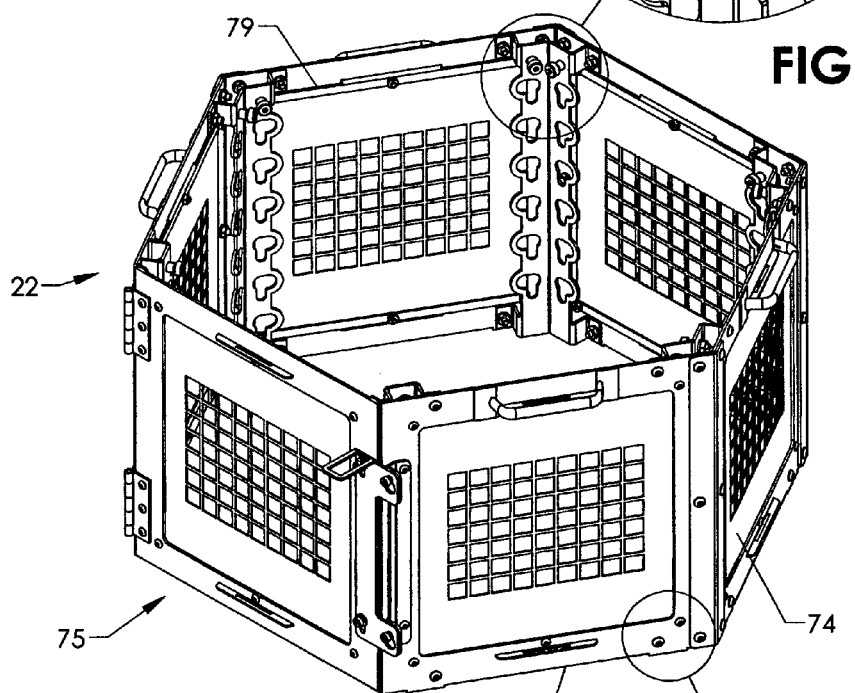
FIG. 4 is an isometric view of the screen assembly illustrating the screen members fastened together in a fixed arrangement by a plurality of internal, vertically-orientated column members, and one panel configured to act as a door, which is described in greater detail herein.
Figure 4B:
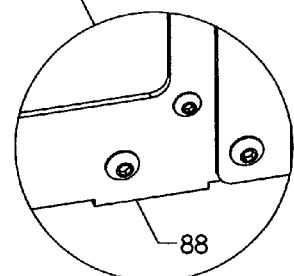
FIG. 4B is an enlarged view of a second portion of FIG. 4 illustrating a tab means on a bottom portion of a screen member, the tab means removably engaging a slot means on a portion of the bottom pan member, the tab and slot means being in registration, respectively.

Positioned between the base pan assembly 18 and the top 20 is a removable screen assembly 22. Referring to FIGS. 1-6, the screen assembly 22 in combination with the base pan assembly 18 define a fire chamber for containing and burning the solid fuel heat source, such as wood and/or charcoal. The screen assembly 22 includes a plurality of screen panels 74, one of which is configured to be used as a door panel member 75, and described in greater detail below. The screen panels 74 have an interior side facing inwardly toward the fire chamber and an exterior side generally viewed by the user. Generally, the screen panel members 74 have a screen member 76 removably affixed to and having at least an outer portion circumscribed by a screen frame member 78. The screen member 76 can be removably retained on the exterior side of the screen panel 74, but preferably is removably retained on the interior side. The screen member 76 can be affixed to the screen frame 78 using any type of means known in the art for this purpose, such as welding, screwing or bolting. As shown in FIG. 4 the screen member 76 is removably retained on the interior side of the screen frame member 78 by a screen holding means 79. The screen holding means 79 can be a channel containing configuration or a separate piece of flat stock material held to the screen frame member 78 by a screw, bolt, rivet, weld or combination thereof, but preferably is bolted to the screen frame member 78.

The screen frame member 78 has a top portion 80, a bottom portion 82, and left and right lateral side portions 84. On the exterior of the frame member 78, and substantially in the middle of the frame top portion 80 and frame bottom portion 82, is a screen holding tab extension 86 projecting from the screen holding means 79 through an opening in said top portion 80 and bottom portion 82. Substantially centrally located, the screen holding tab extension 86 has a slot 87 that is used to affix a wind/heat shield, described in greater detail below, to an individual screen panel 74. Excepting the door panel member 75, each bottom portion 82 further includes at least one and preferably two tab means 88 that are in registration with the slots 40 in the first mating flange 34. The interrelations of the tab means 88 with the slots 40 in combination with the vertical alignment member 42 allows the user to remove as well as (re-)mount the screen assembly 22 onto the base pan assembly 18 and retain the two assemblies in secure alignment. In one embodiment, the screen holding means 79 is a separate member inserted into a slot in the top portion 80 of the frame member 78 and integrates the exterior offsets 86

Excepting the door panel member 75 and the immediately adjacent side panels affixed to the door panel 75, the screen panels 74 are joined together by a plurality of multi-component vertically-oriented panel connectors, which include an interior connector 90 and an exterior connector 92. The exterior connector 92 is preferably stamped and formed at an appropriate angle depending upon the configuration of the fireplace, for example, 3 sides—60 degrees, 4 sides—90 degrees and so forth. The exterior connector 92 includes at least one, preferably two first apertures 94, and more preferably a plurality of first apertures 94 equidistant positioned in a top, middle and bottom portion of the exterior connector 92. Desirably, the first apertures 94 are in registration with second apertures 96 in the screen frame members 78. The screen frame member 78 and the exterior connector 92 may be screwed, riveted, welded, bolted or otherwise joined together.

The interior panel connector 90 serves several functions in the several embodiments of the present invention. The interior panel connector 90 is desirably a stamped or laser cut one-piece construction and is bent at an angle similar to that of the exterior panel connector 92. The interior panel connector 90 includes an upper portion 98 and a distal lower portion 100 each having a pair of "L" shaped flat extensions with a third aperture 102 in an end piece. The third aperture 102 is adapted to be in registration with a fourth aperture 103 in the screen frame member 78 so that the interior panel connector 90 and screen frame member 78 can be joined by screwing, bolting or riveting together. An important feature of the present invention is that the exterior panel connector 92 and the interior panel connector 90 are not connected or joined utilizing the same apertures in the screen frame member 78. The importance of this will become better understood in the description below.

On the upper portion 98 of the interior panel connector 90 are a pair of pin means 104 for securing to the screen assembly 22 a variety of cooking devices described in greater detail below. The pin means 104 extend inwardly from the surface of the interior panel connector 90. Referring to FIG. 4A, the pin means 104 has a relatively smaller neck portion 106 adjacent to the interior panel connector surface and a relatively larger head portion 108 projecting inwardly toward the fire chamber and connected to the neck portion 106. Adjacent to and positioned below the pin means 104 are a plurality of evenly-spaced first elevation adjustment slots 110. The first elevation adjustment slots 110 are in a juxtaposed paired configuration and arranged from the upper portion of the interior panel connector 98 to a predetermined position toward the lower portion 100. The first elevation adjustment slots 110 have a generally modified "T" configuration for adjustably engaging and securing a mating second pin means attached to the variety of cooking devices described in greater detail below.

The door panel member 75 on the screen assembly 22 is similar to the other screen panel members 74 described above, except the bottom portion 82 does not have any bottom tab means 88 for securing the door panel member 75 to the base pan assembly 18 and excludes an exterior panel connector 92. On one lateral side portion 84 is one-half of a hinge means 112a. Joined to an adjacent screen panel 75 is a mating portion 112b of the hinge means. The screen frame member 78 holding the hinge means 112b understandably includes a series of openings that are in alignment with holes in the hinge means for securing the hinge means 112b to the frame member 78 when screws, bolts or rivets are used to fasten the hinge means 112b to the frame member 78.

The opposing lateral side portion relative to the hinge location includes a latching means 114. The latching means 114 includes a latching plate 116 movably connected to the lateral side portion of the door panel member 75. The latching plate 116 has an upper section and a lower section having two, vertically elongated slots, wherein the latching plate 116 is movably connected to the door panel member 75 by aligning the vertically elongated slots with a pair of loosely mounted registered bolts in the screen frame member 78. The latching means 114 includes a handle for moving the latching plate 116 in an up and down motion for opening and closing the door member 75. The latching plate 116 includes a means 118 for securing the door member 75 in a closed position comprising a pair of inverted "T" shaped apertures 120 that are adapted to securely engage a pair of latch pins 122 affixed to a latch bracket 124 which is itself is fixedly attached on an adjacent screen frame member 78. The latch bracket 124 can be joined to the adjacent screen frame member 78 using screws, bolts, rivets, welding, and combinations thereof.

Attached to the two side screen panels 74 adjacent to the door panel member 75 are first and second half interior panel connectors 126 and 127, respectively. The first half interior panel connector 126 is similar to the interior panel connectors 90 described above, except the upper portion 98 and a distal lower portion 100 each having a single "L" shaped flat extension with an aperture 102 in the end piece. The third aperture 102 is adapted to be in registration with the fourth aperture 103 in the screen frame member 78 so that the first half interior panel connector 126 and screen frame member 78 can be joined together by screwing, bolting or riveting. On the upper portion 98 of the first half interior panel connector 126 is a single pin means 104. Adjacent to and positioned below the pin means 104 is a single column of a plurality of evenly-spaced first elevation adjustment slots 110. The first half interior panel connector 126 also includes a sealing flange 128 for substantially sealing air infiltration into the fire chamber when the door panel member 75 is closed.

The second half interior panel connector 127 is similar to the first half interior panel connector 126 described above, except the sealing flange 128 includes a series of cut-outs 130 that provide clearance for the mating hinge means 112b when bolts, screws or rivets are used to mount the hinge means 112b to the frame member 78. Advantageously, during use of the fireplace 10, the door panel member 75 can be opened to access the fire chamber for adding to or arranging the solid fuel heat source without placing the user in a location or position that could have the user inadvertently contact the fire or embers.

Desirably, at least two of the screen panels 74 include an exterior handle 131 affixed to the top portion 80 of the screen frame member 78. Preferably, when the fireplace 10 has more than four (4) sides at least three (3) of the screen panels 74 include a handle 131, and more preferably when the fireplace 10 has six (6) or more sides at least two and desirably at least four (4) of the screen panel members include a handle 131. As illustrated in the drawings of figures, the handles 131 are positioned on opposing faced screen panels 74 to facilitate lifting and aligning the screen assembly 22 on the base pan assembly 18 and particularly on the first mating flange member 34 in the manner described above.

Figure 10:
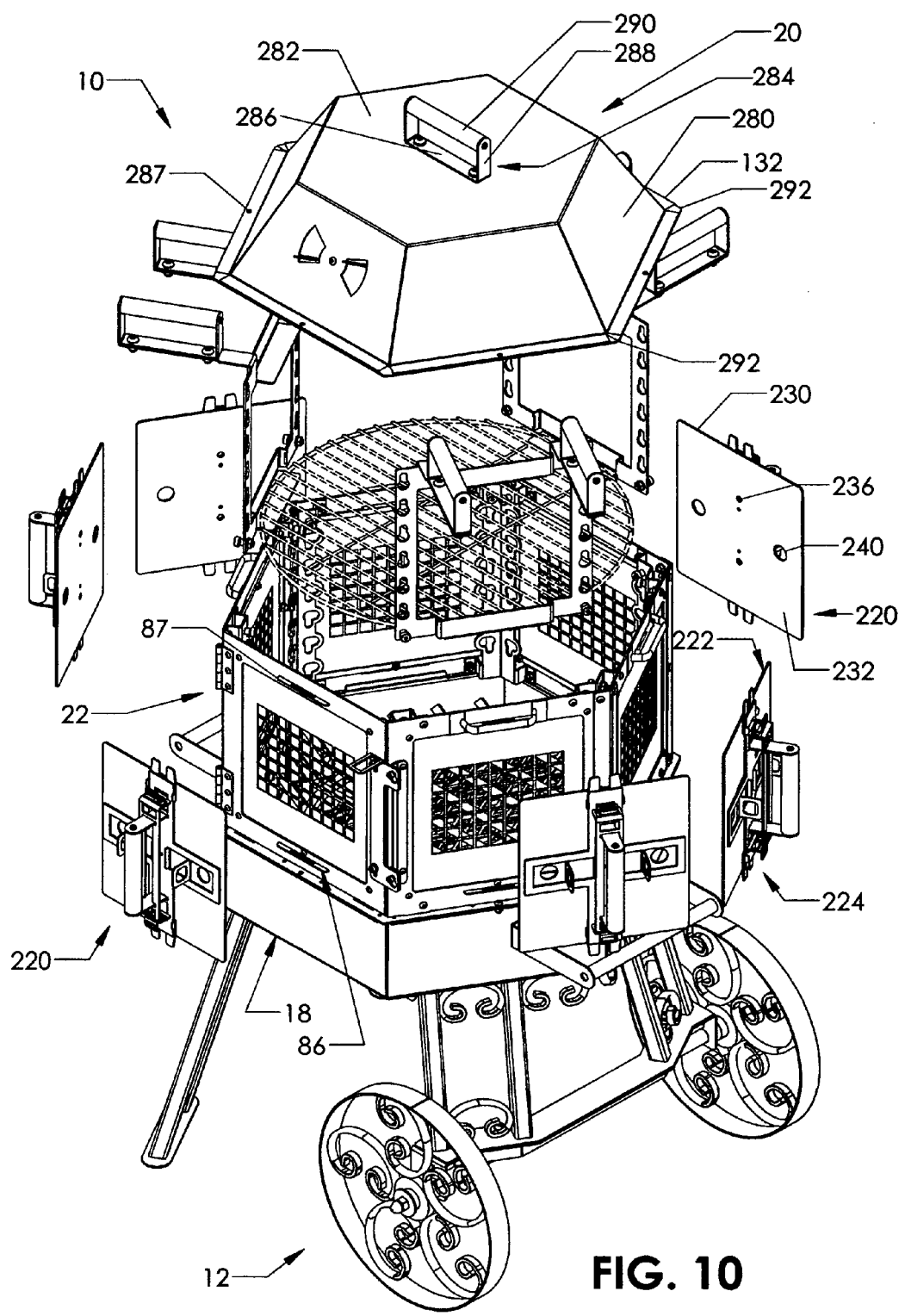
FIG. 10 is a partially exploded view of another cooker embodiment wherein at least one of the panels are covered by at least one external deflector or shield to use the device of the present invention as an enclosed grill.
Figure 10A:
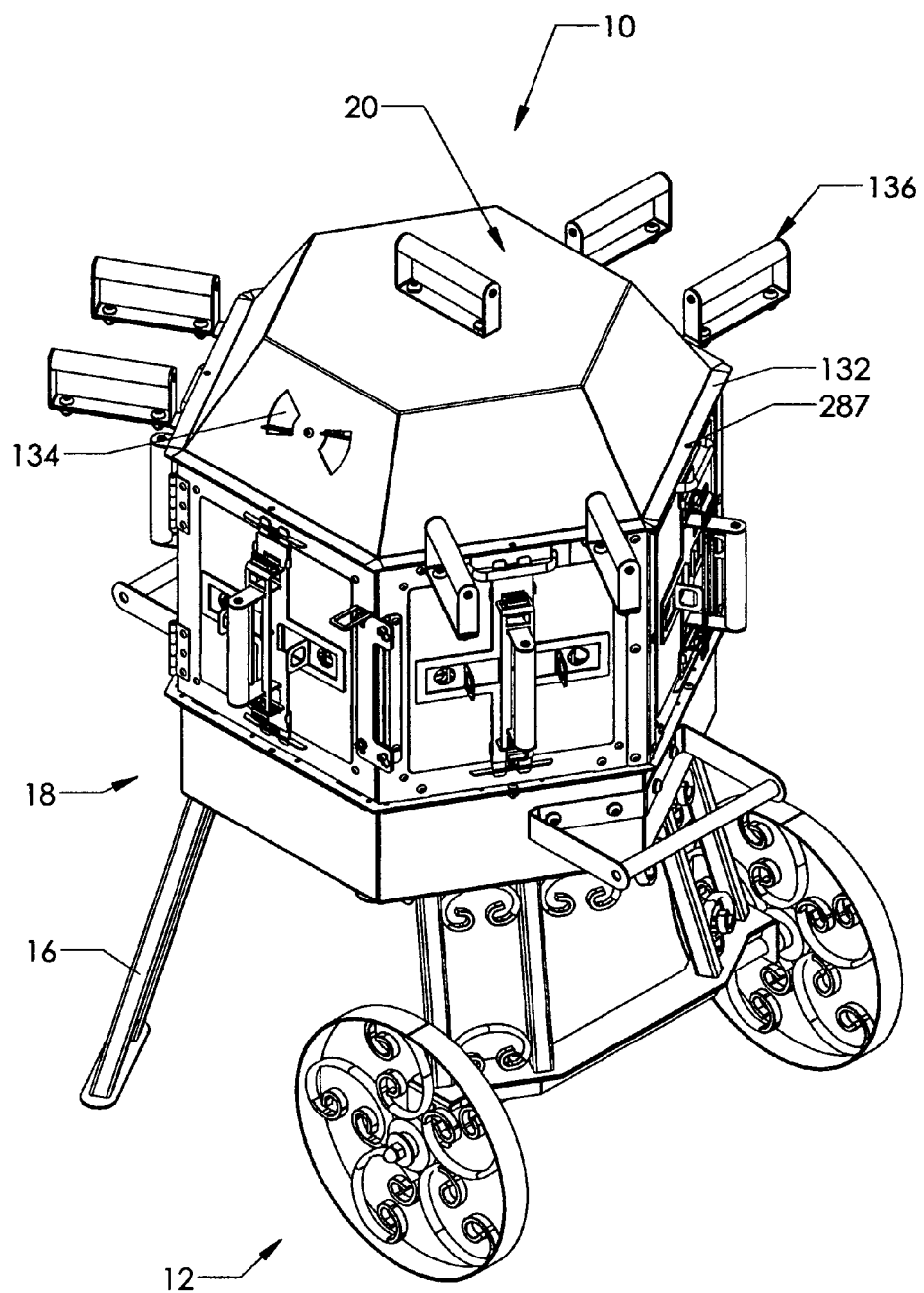
FIG. 10A is an isometric view of the embodiment of FIG. 10 illustrating using a plurality of removable, external deflectors or shields to advantageously allow control of air infiltration to the heat source, thereby regulating the heat generation for a more even and predictable cooking temperature.

Referring to FIG. 10, the fireplace 10 can optionally include a top or cover 20. The top 20 is configured to overlay the screen assembly 22 and includes an outwardly disposed flange 132 mirror imaged to the first mating flange 34 on the base pan assembly 18 for positioning the top or cover over the screen assembly 22. Desirably, the top 20 has an air portal 134 and preferably an adjustable air portal 134 having a means for adjusting and controlling air infiltration into the unit when utilized as a cooker, which is described in greater detail below. Such air adjusting means are well know in the art and typically include a plate moveably fastened over an opening in the cover 20 so that during use the plate is opened the desire amount to control, smoke exhaust and heat generation.

Open Pit Grill

An important aspect of the present invention is the adaptability of the fireplace 10 to be converted, while having burning embers or an open flame, to a grill. One such embodiment is an "open pit grill", this term is to describe and clarify the embodiment of the invention wherein the screen members 76 are not closed off or partially occluded and the lid can optionally be used during the grilling of food.

Referring to FIGS. 1-9, the open pit grill incorporates by reference the description of the fireplace 10 described above and further includes at least one, preferably at least two and more preferably three adjustable grill bracket assemblies 136. The grill bracket assembly 136 has a pair of spaced apart grill height adjustment members 138. The grill height adjustment members 138 have a top portion 140 and a bottom portion 142. Each grill height adjustment member 138 has a plurality of second elevation adjustment slots 144 arranged in a single column. The second elevation adjustment slots 144 are similar to the first elevation adjustment slots 110 in the interior panel connector 90 described above, except the second elevation slots 144 are inverted so that the grill bracket assemblies 136 can be adjustably mounted, as described below, to the interior panel connector 90 for converting the fireplace 10 to an open pit grill.

Positioned in the bottom portion 142 of each grill height adjustment member 138 is a pin means 146 for engaging the first elevation adjustment slots 110 in the interior panel connector 90. Pin means 146 has a relatively smaller neck portion 106 adjacent to the grill height adjustment member 138 and a relatively larger head portion 108 connected to the neck portion 106. The pin means 146 are similar to the pin means 104 described above except the pin means 146 projects outwardly back toward the panel member 76 whereas the pin means 104 described above projects inwardly toward the fire chamber.

Figure 7:
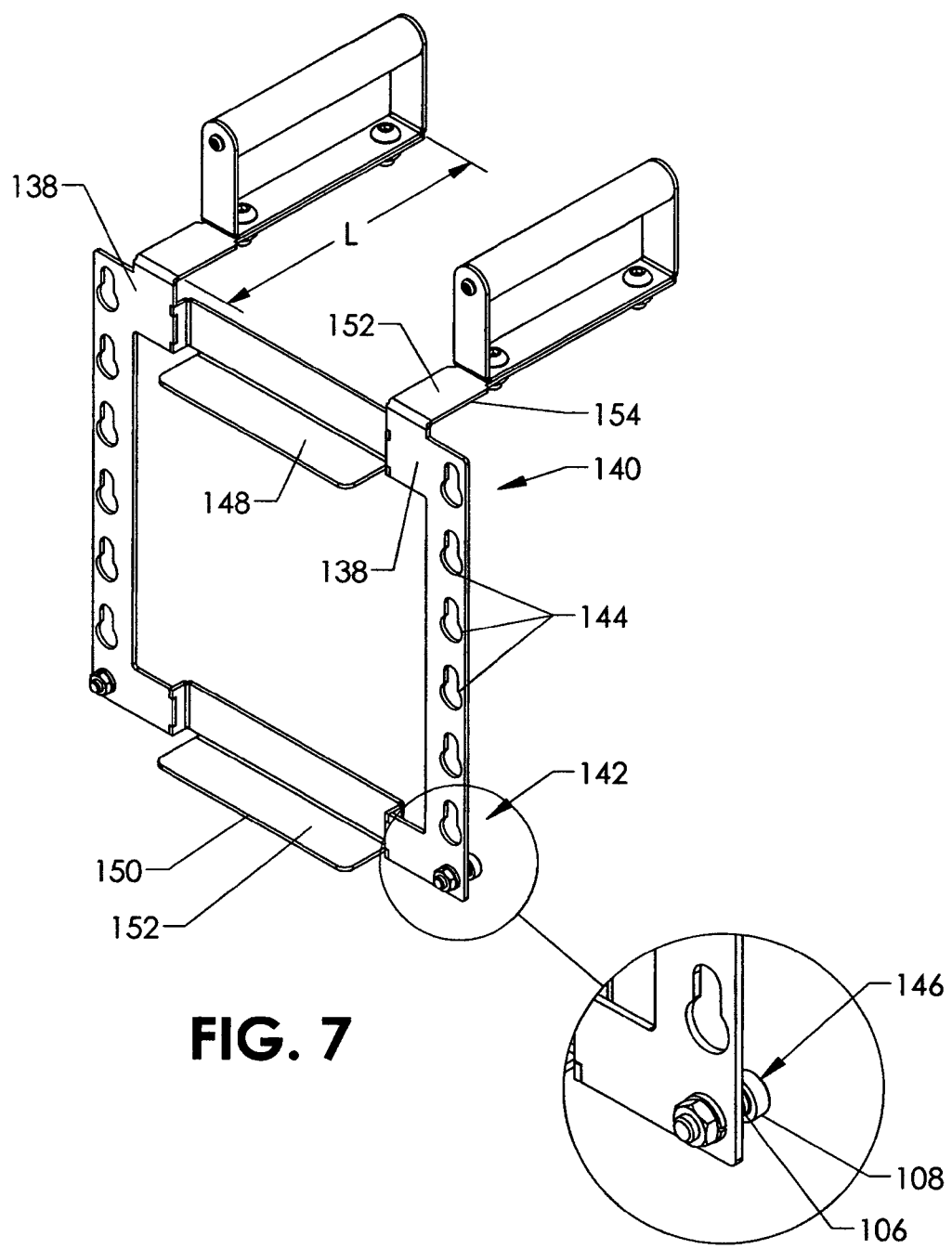
FIG. 7 is an enlarged view of a cooking grate holding bracket.
Figure 7A:
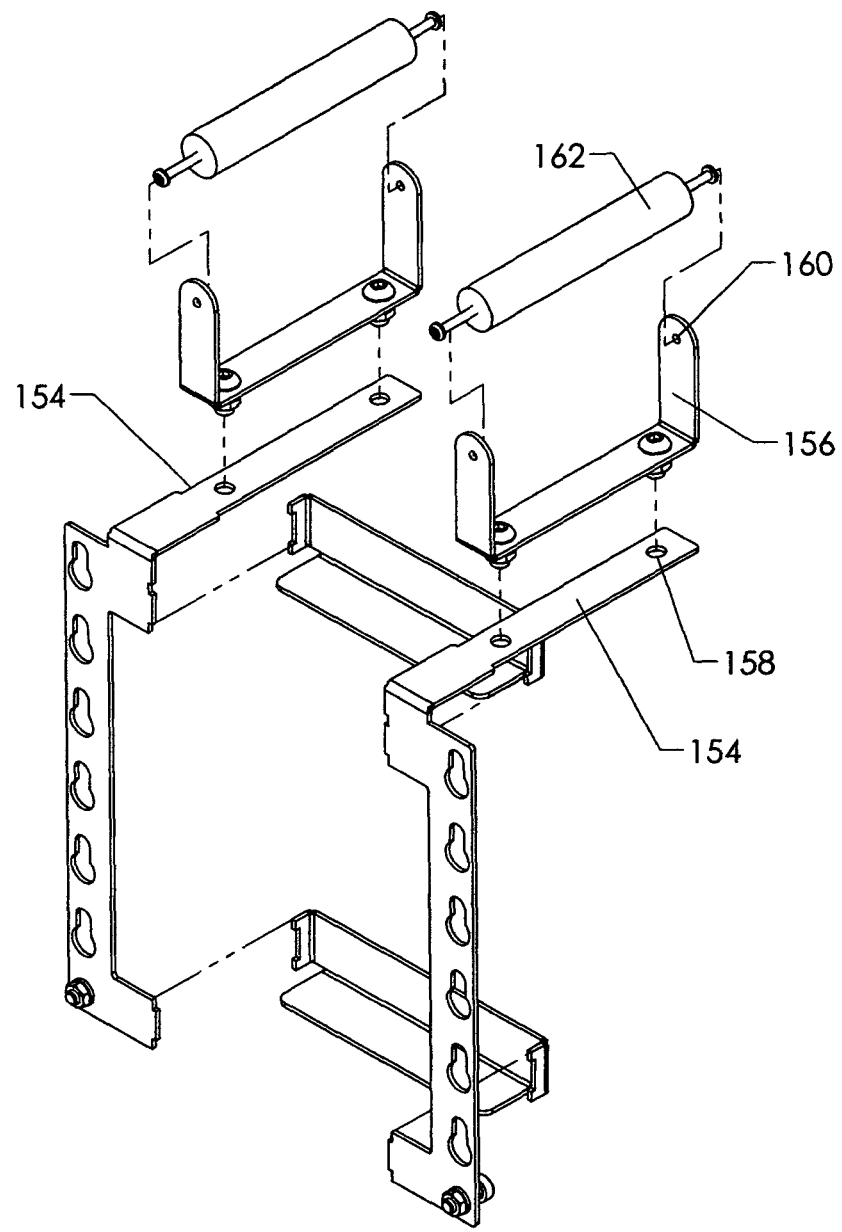
FIG. 7A is an exploded view of the cooking grate holding bracket.

Positioned between and joined to the two grill height adjustment members 138 is an upper grill support shelf 148 affixed to the top portion 140 and a lower grill support shelf 150 affixed to the bottom portion 142. The grill support shelves 148 and 150 are appropriately sized so that a typical cooking grate, not part of the invention, may be utilized in the open pit grill embodiment. Generally, the grill support shelves 148 and 150 have a ledge portion 152 having a length of from 0.5 of an inch (1.25 cm) to about 3 inches (7.5 cm), preferably a length of from about 0.75 of an inch (2 cm) to about 2 inches (5 cm), and more preferably a length of from about 1 inch (2.54 cm) to about 1.5 inches (3.8 cm). As illustrated in FIG. 7, the grill support shelves 148 and 150 optionally have a slight outward offset relative to the grill height adjustment members 138.

Referring to FIG. 7, positioned on the top portion 140 of each grill height adjustment members 138 is an arm member 154 oriented at an angle of about 90° relative to the height adjustment member 138. The arm member 154 has a length "L" of from about 6 inches (15 cm) to about 9 inches (23 cm) as measured from the height adjustment member 138 to the end of the arm member 152. Affixed to each arm member 152 is a generally "U" shaped top handle bracket 156.

The lower portion of the top handle bracket 156 and the arm member 154 include at least one and preferably two apertures 158 that are in registration for affixing the top handle bracket 156 to the arm member 154 using screws or bolts. Optionally, the top handle bracket 156 can be affixed to the arm member 154 by welding, not shown. On each end of the handle bracket 156 is a handle aperture 160 used for affixing a handle 162 to the handle bracket 156. The handle 162 may be affixed to the handle bracket 156 using any means known in the art, for example, screws, rivets, bolts or combinations thereof.

Figure 6:
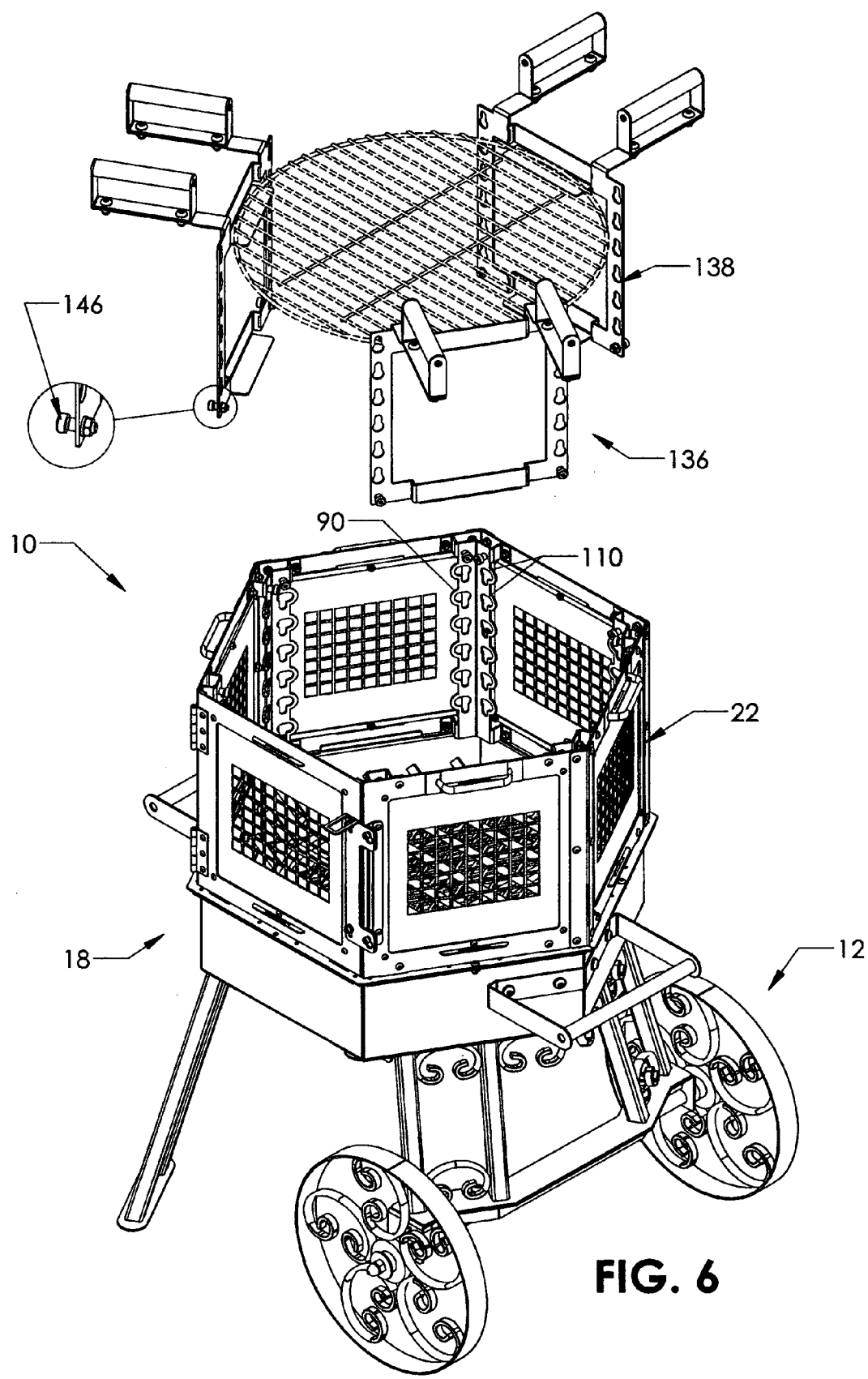
FIG. 6 is a partial exploded view of an alternative embodiment of the present invention wherein the fireplace is used as an open pit grill.
Figure 8:
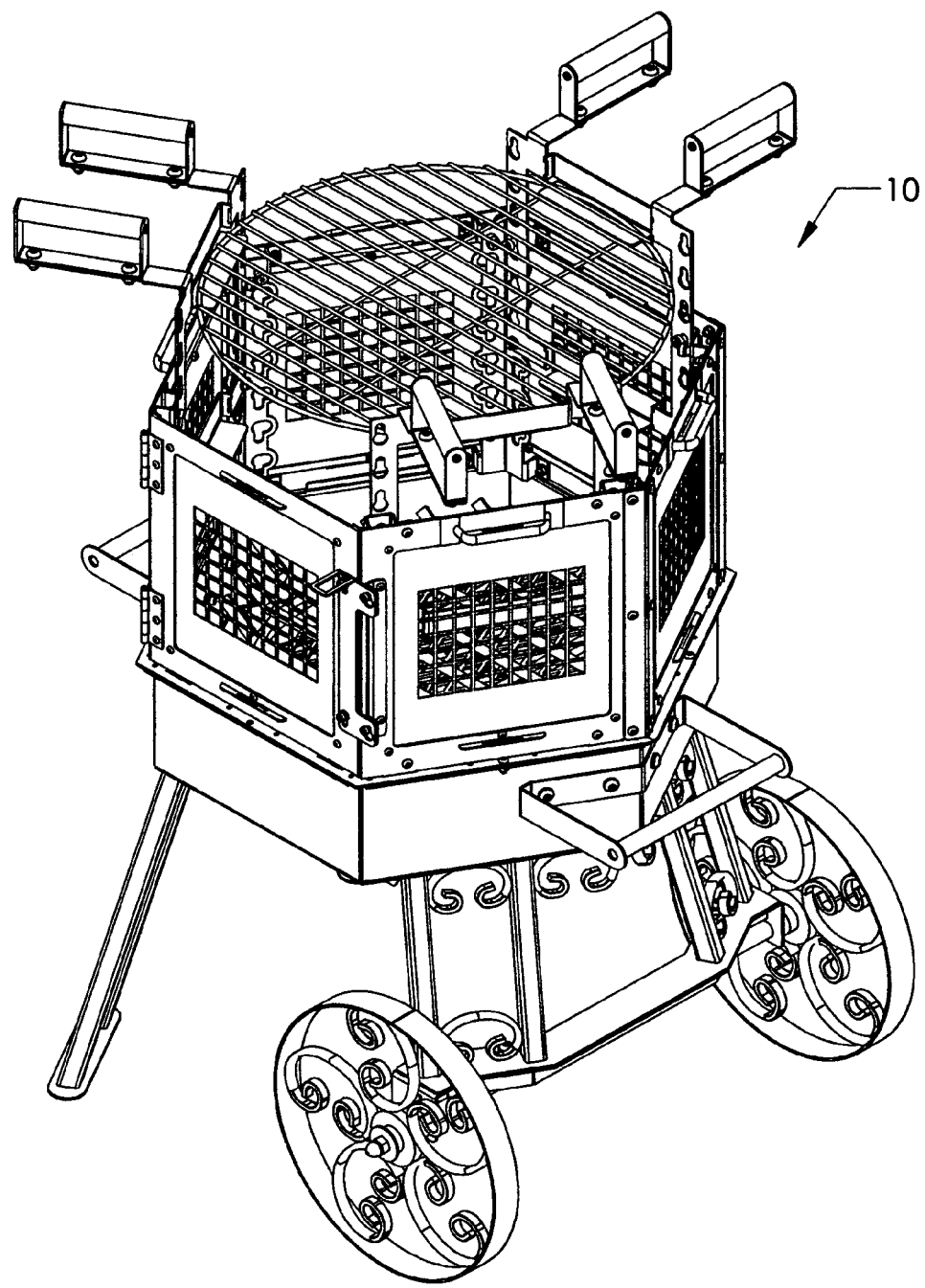
FIG. 8 is a perspective view of the embodiment of FIG. 6 illustrating how a plurality of cooking grate holding brackets are utilized in holding a cooking grate at different levels.

Referring to FIGS. 6-8, to utilize the open pit grill, the top or cover 20 can optionally be left off the grill. The grill bracket assembly 136 is inserted into the fire chamber while holding the handles 162. The pin means 146 is inserted into a predetermined first elevation adjustment slot 110 on the interior panel connector 90. A corresponding second elevation adjustment slot 144 on the grill bracket assembly 136 is aligned with the pin means 104 on the upper portion 98 of the interior panel connector 90. The two pair of aligned pin means 146 and 104 are then inserted into the mating elevation slots 110 and 144, respectively. The grill bracket assembly 136 is then pushed downwardly to lock the respective pin means 146 and 104 into the mating elevation slots 110 and 144, respectively. The grill bracket assembly 136 is now locked into the screen assembly 22. Advantageously, the cover 20 can also be used when the grill bracket assemblies are affixed to the screen assembly in such a manner that the top portion 140 of the grill brackets extend above the top portion 80 of the frame member.

Open Pit Rotisserie

Recently, the advantages of using a rotisserie to cook such foods as whole chickens or beef cuts, such as a roast, have become apparent. A few of these advantages are: the food is cooked more uniformly, grill flare-ups are not as detrimental to the quality of the cooked food, and seasonings placed an the meat are not inadvertently deposited on the cooking grill surface, thereby reducing seasoning enhancement of the finished product. Therefore, another unique and important aspect of the present invention is the adaptability of the fireplace 10 to be easily converted, while having burning embers or an open flame, to a rotisserie.

Referring to FIGS. 1-9, the open pit rotisserie incorporates by reference the description of the fireplace 10 described above and further includes two mountable, adjustable rotisserie bracket assemblies 164. Since both rotisserie bracket assemblies 164 are identical, only one will be further described in greater detail. The rotisserie bracket assembly 164 has a vertical height adjustment member 166, which can be fabricated from a single stamped piece or laser cut to predetermined dimensions. The height adjustment member 166 has a height "h" as measured from a top portion 168 and a lower or bottom portion 170 of from about 6 inches (15 cm) to about 3 feet (91 cm), preferably the height is from about 6 inches to about 2.5 feet (76 cm), more preferably from about 6 inches to about 2 feet (30 cm), and most preferably from about 6 inches to about 18 inches (46 cm). The height adjustment member 166 is bent in substantially the center at an angle to match the angle of the interior panel connector 90, to form a left portion 172 and a right portion 174. The left portion 172 and a right portion 174 each have a plurality of correspondingly third elevation adjustment slots 176 arranged in a columnar format. The third elevation adjustment slots 176 are similar to second elevation adjustment slots 144 described above for the grill bracket assembly 136, except the third elevation adjustment slots 176 are elongated to accommodate the angled rotisserie height adjustment member 166 and so that the rotisserie bracket assemblies 164 can be adjustably mounted, as described below, to the interior panel connector 90 for converting the fireplace 10 to a rotisserie cooking device.

In the bottom portion 170 of each rotisserie height adjustment member 166 is a pin means 178 for engaging the first elevation adjustment slots 110 in the interior panel connector 90. Pin means 178 has a relatively smaller neck portion 106 adjacent to the rotisserie height adjustment member 166 and a relatively larger head portion 108 connected to the neck portion 106. The pin means 178 are similar to the pin means 146 described above for the grill bracket assembly and like the pin means 146 projects outwardly back toward the screen panel member 76.

In the top portion 168 and extending laterally from each left and right portions 172 and 174, respectively, of the rotisserie height adjustment member 166 are substantially flat, left ear portion 180 and right ear portion 181, respectively. The ear portions 180 and 181 extend from the shoulder of the respective left and right portions 172 and 174 a length of from about 0.5 of an inch to about 3 inches, and preferably from about 0.75 of an inch to about 2 inches. The ear portions 180 and 181 are bent outwardly relative to the left and right portions 172 and 174 at an angle that is sufficient for the left and right ear portions 180 and 181 lie in substantially the same plane. Each ear portion further includes two holes 182 set in from the ear portion edge by about 0.5 of an inch. The two holes are in substantially vertical alignment.

Extending from and affixed to each ear portion 180 and 181 are an upper extension member 184 and a lower extension member 185. The extension members 180 and 181 are substantially identical and are generally in the shape of a "]" having a first orifice 186 on a first end and a second orifice 187 on the distally spaced opposing second end. The first orifice 186 on the first end of the extension members 184 and 185 are utilized to affix the extension members 184 and 185 to the ear portion via holes 182 using screws, bolts or rivets, but preferably, bolts are used. The second orifice 187 on the second end of the extension members 184 and 185 are used to mount a rotisserie mounting plate 188 to the extension members 184 and 185. The rotisserie mounting plate 188 can be affixed to the second end of the extension members 184 and 185 using screws, bolts or rivets, but preferably, bolts are used.

The rotisserie mounting plate 188 has a top portion 190 having a plurality of vertically oriented, and horizontally aligned slots 192 which are used to removably affix a motorized rotisserie unit, not shown, available from any commercial retailer purveying outdoor cooking equipment, to the rotisserie mounting plate 188. A lower portion 194 of the rotisserie mounting plate 188 has a plurality of holes 196 for affixing a handle bracket 198 to the rotisserie mounting plate 188. The handle bracket 198 can be affixed to the rotisserie mounting plate 188 using bolts, screws, rivets or a combination thereof, but preferably bolts are used. The handle bracket 198 is generally configured in the shape of a "U" having outwardly extending members 200. At or close to each end of the extending members 200 is a hole 202 utilized for affixing a handle 204 to the handle bracket 198. The handle 204 can be affixed to the handle bracket 198 using bolts, screws, rivets or a combination thereof. Desirably, the handle 204 is from about 3 to 8 inches in length and has a diameter of from about 0.5 to about 2 inches in diameter. Preferably the handle 204 is from about 4 to about 6 inches in length and from about 0.75 to about 1 inch in diameter. Desirably, the handle 204 is fabricated from a resilient material such as wood, ceramic, polymer, or a coiled metal to dissipate any heat. Preferably, the handle is made from wood.

Figure 9:
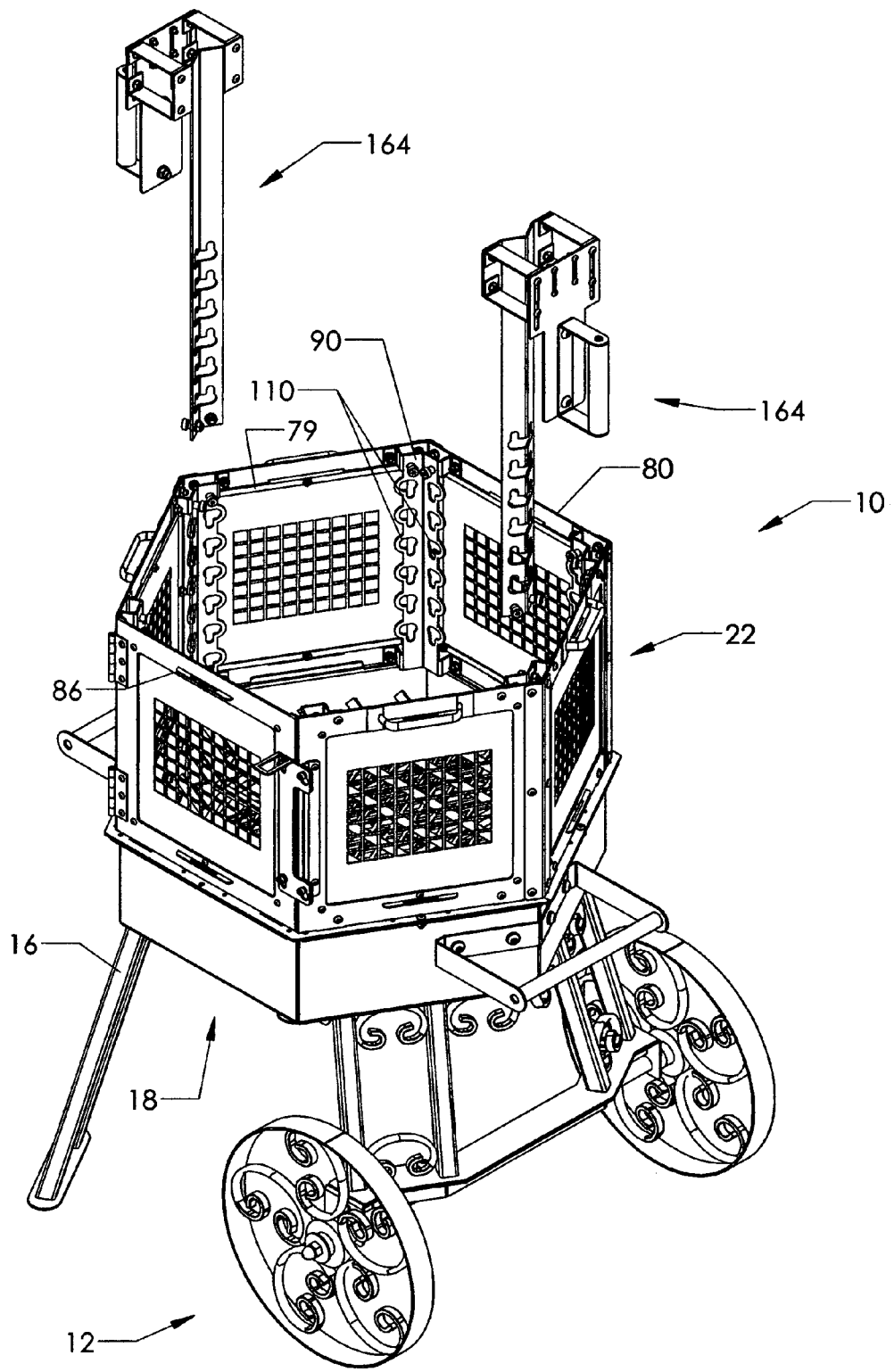
FIG. 9 is a partial exploded view of an alternative embodiment of the present invention wherein the fireplace can be used as an open pit rotisserie, (rotisserie motor and skewer not shown) wherein the cooker includes a pair of rotisserie extension members.
Figure 9A:
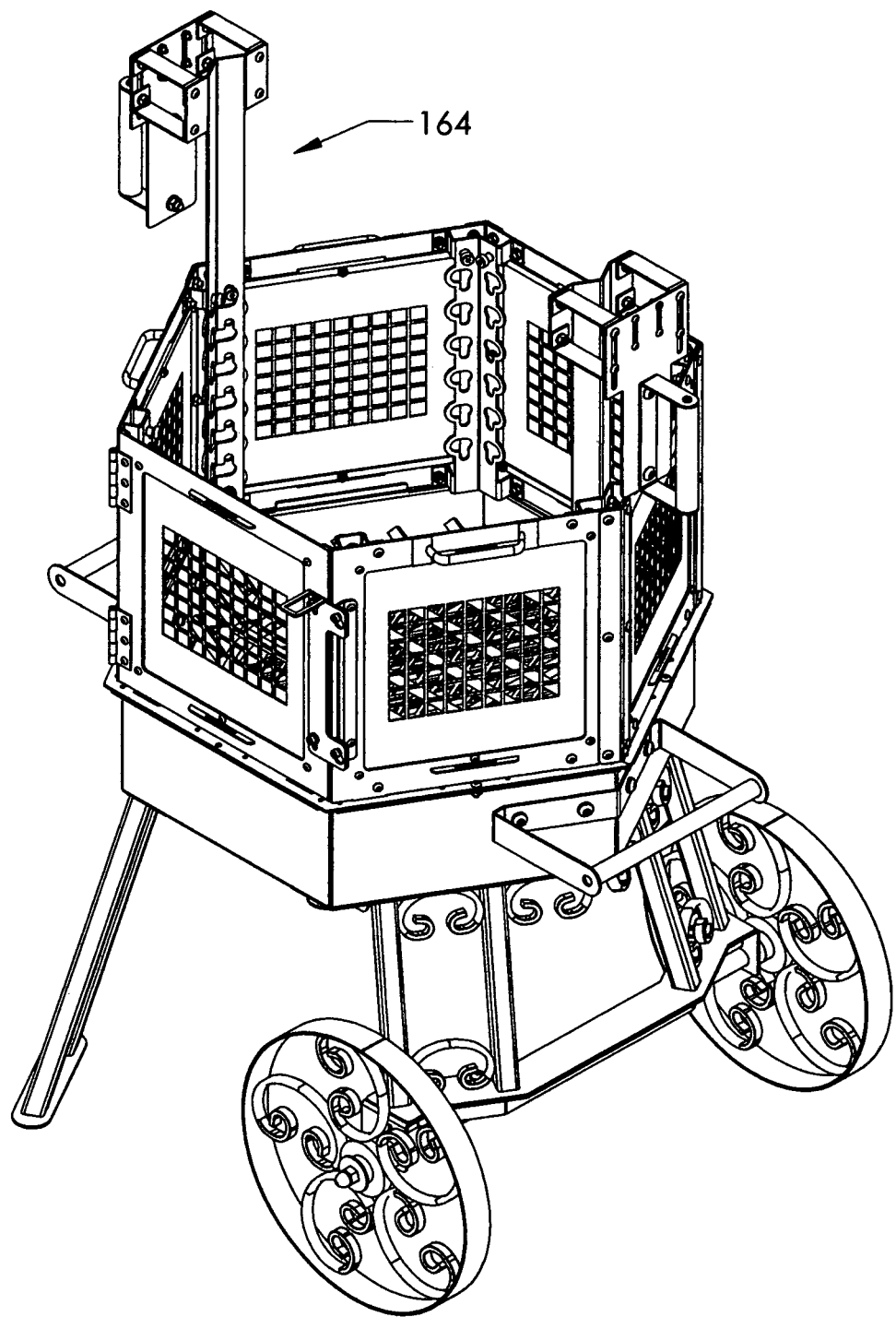
FIG. 9A is an isometric view of the embodiment of FIG. 9 illustrating how the plurality of rotisserie extension members adjustably and removably engage the vertically-oriented panel connecting members of the panel assembly.
Figure 9B:
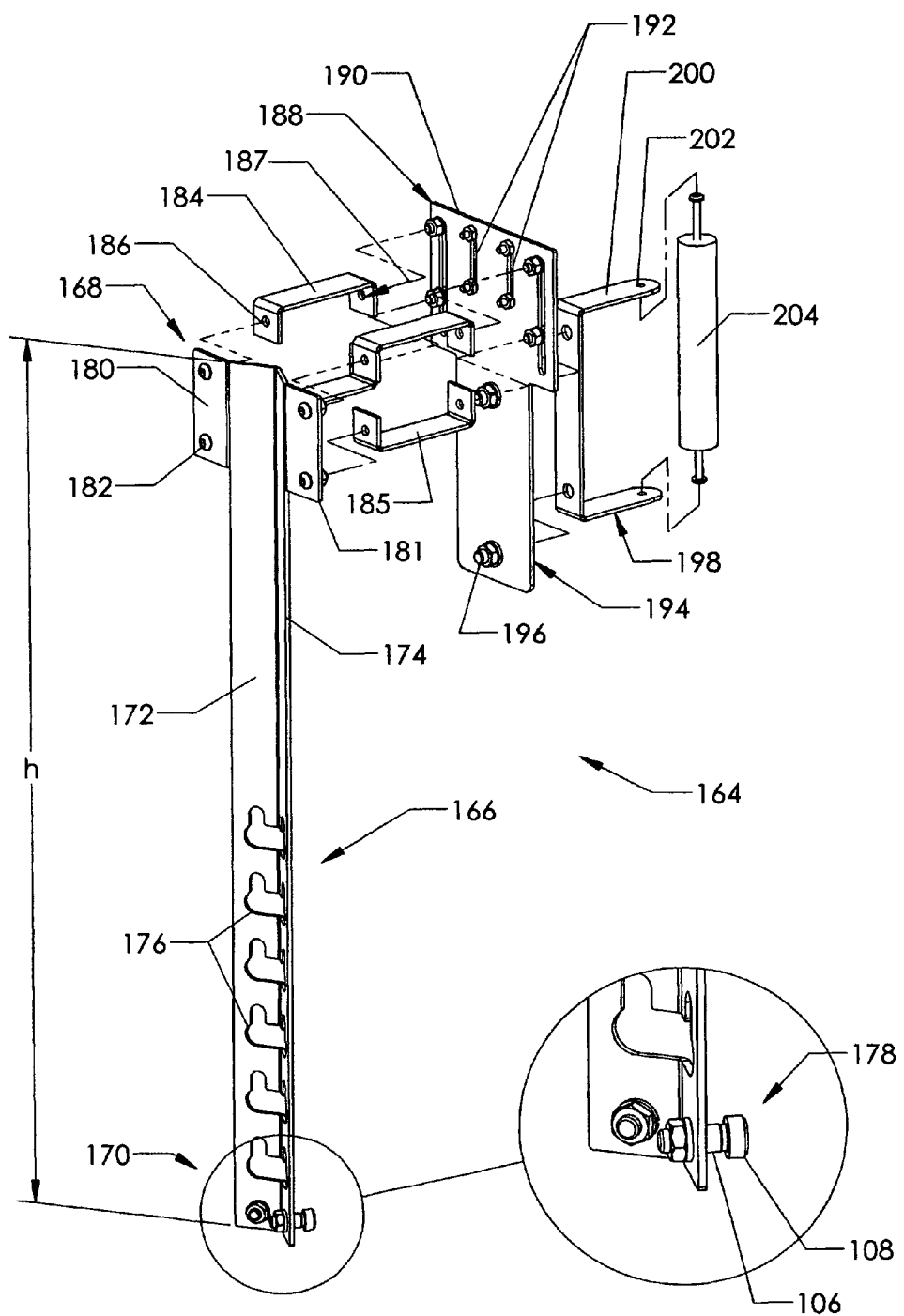
FIG. 9B is an enlarged exploded view of a rotisserie extension member.

Referring to FIGS. 9-9B, to utilize the fireplace 10 as an open pit rotisserie, the top or cover 20 is omitted. The rotisserie bracket assembly 164 is inserted into the fire chamber while holding the handles 204. The rotisserie pin means 178 is inserted into a predetermined first elevation adjustment slot 110 on the interior panel connector 90. A corresponding third elevation adjustment slot 176 on the rotisserie height adjustment member 166 is aligned with the pin means 104 on the upper portion 98 of the interior panel connector 90. The two pair of aligned pin means 178 and 104 are then inserted into the mating elevation slots 110 and 176, respectively. The rotisserie bracket assembly 164 is then pushed downwardly to lock the pin means 178 and 104 into the mating elevation slots 110 and 176, respectively. The rotisserie bracket assembly 164 is now locked into the screen assembly 22. A rotisserie motor and skewer, not shown, are then mounted onto the rotisserie bracket assembly 164 via one or more slots 192 in the rotisserie mounting plate 188.

Enclosed or Partially Enclosed Fireplace and Cookers

Another embodiment of the present invention is an enclosed or partially enclosed assemblage, such as a fireplace, grill, or smoker. A novel aspect of the present invention is, advantageously, the convertibility of the open fireplace 22 to be readily and easily converted to a partially or fully enclosed fireplace or cooker without exposing the user to any inadvertent contact with flames or embers in the fireplace.

Referring to FIGS. 1-11, closed fireplace and cookers incorporate by reference the description of the fireplace 10 and open grill assemblies 136 described above and further includes at least one, and preferably a plurality of shielding means 220. The shielding means 220 has a top portion 222, a distally positioned bottom portion 224, a left side 226, and a distally positioned right side 228 and in which these relative positions translate for descriptive purposes to the after described parts and members comprising the shielding means 220. The shielding means 220 includes a cover plate 230 having substantially flat, interior facing surface 232 and an exterior facing surface 234. The cover plate 230 has a pair of relatively small holes 236 substantially aligned along the vertical axis of the cover plate 230. The cover plate 230 dimensions are such that the cover plate 230, when in use, will fit within the inside boundaries of the screen frame member 78.

The relatively small holes 236 are used in aligning a handle assembly 238 to the exterior facing surface 234 prior to attachment, as described in greater detail below. The cover plate 230 has a pair of relatively larger holes 240 substantially aligned along a horizontal axis of the cover plate 230. These larger holes 240 are advantageously used for moderating the amount of air entering the fire chamber to control the rate of fuel consumption and heat generation of the solid fuel source. Accordingly, the holes should have a sufficient dimension for promoting combustion of the fuel source to retain a desired heat output. In one embodiment, the holes 240 have a diameter of from about 0.25 of an inch to about three (3) inches, and preferably are from about 0.5 of an inch to about 1.5 inches.

The handle assembly 238 on the exterior facing surface 234 includes a means for removably attaching the shielding means 220 to the screen panels 74, which comprises a first movable latch member 242 mounted on the top portion 222 and a second movable latch member 244, distally spaced from the first latch member 242 and mounted on the bottom portion 224, both being preferably substantially centered along the vertical axis of the shielding means 220. The latch members 242 and 244 each have a pair of lateral ear members 246 and a gripping member 248 extending outwardly from the bottom portion of each latch member 242 and 244.

Positioned between the first and second latch members 242 and 244 is a handle bracket 250 having a pair of spaced-apart, outwardly extending arms 252, each having a through hole positioned close to and inward from the end of the arm 252. Positioned laterally from the handle bracket 250, i.e., on the left and right sides 226 and 228, are a pair of spaced-apart, movable vent cover members 254. The vent cover members 254 include: a flat portion 256 adapted to cover at least a portion of the air hole 240 in the cover plate 230 and positioned in a plane along parallel to the cover plate 230, a dimensionally smaller ear member 258 adjacent to the handle bracket 250, and a gripping member 260 opposingly positioned relative to the ear member 258. The ear member 258 and gripping member 260 both extend outwardly from flat portion 256.

Overlaying at least a portion of: a) the first and second latch members 242 and 244; b) handle bracket 250; and c) vent cover member 254 is a latch and vent retaining member 262. The latch and vent retaining member 262 is generally configured in the shape of a plus sign "+" or cross wherein the four arms extend from the top portion 222 to the bottom portion 224 and from the left side 226 to the right side 228 of the cover plate 230. Top and bottom portions each include a cut-out, holes or apertures for extending the arm 252 of the handle bracket 250 and the gripping member 248 of the respective latch member 242 and 244 through and further allow for a slidable functionality of the respective latch members 242 and 244. Desirably, at least one cut-out for the gripping member 248 is sized sufficiently to allow for the latch member 242 and/or 244 to be recessed behind the cover plate 230 when the shielding means 220 is mounted over the screen panel 74. Additionally, to retain the latch member 242 and 244, the opposing pair of ear members 246 are spaced apart sufficiently to reside outside of, but adjacent to, the latch and vent retaining member 260. The left and right portions of the latch and vent retaining member 262 include a cut-out for extending the ear member 258 and gripping member 260 through. The cut-out is suitably dimensioned to movably retain the vent cover member between the latch and vent retaining member 262 and the cover plate 230.

Positioned over at least a portion of the latch and vent retaining member 262 is a latch locking member 264. The latch locking member 264 is vertically-oriented, aligned along the longitudinal axis, and includes a pair of spaced apart cut-outs for extending the arm 252 of the handle bracket 250 through. Adjacent to each cut-out, the latch locking member 264 bends 90° to form extension portions 266 having a second cut-out. The extension portions 266 have a length sufficient to retractably engage the respective gripping member 248 on the latch members 242 and 244. Affixed to the arms 252 on the handle bracket 250 is a handle member 268 for safely gripping/handling the shielding means for mounting and removing the shielding means 220 onto a screen panel. The handle member 268 can be affixed to the arms 252 using any means known in the art, including, but not limited to screwing, bolting, pinning, nailing, riveting and combinations thereof. The handle member 268 can be fabricated from any material that is heat resistant including wood, ceramics, and stone, but preferably is wood.

In use, the shielding means 220 is placed over the screen member 76 so that the interior 232 of the cover plate 230 faces toward the fire chamber. The latch locking member 264 is disengaged by pulling the member toward the handle member 266, allowing the first and second latch members 242 and 244 to slidably engage the slots 87 in the offsets 86 attached to the top portion 80 and bottom portion 82 of the screen frame member 78. Once engaged, the latch locking member 264 is moved inward so that the extension portion 266 resides beneath the gripping member 248, thereby preventing accidental dislodging or movement of the latch member 242 and 244 from the slots 87.

Advantageously, the shielding means 220 can be used with the fireplace 10 in such a manner so as to partially close-off a side of the fire chamber in the event wind is predominantly attacking the fireplace in a particular direction. This allow the user to enjoy a view of a fire and not have the wind directing smoke, ash and possibly sparks toward the user.

Closed Grill

In another embodiment, the present invention can be utilized as a closed cooking grill. Continuing reference to FIGS. 1-11 the enclosed grill incorporates by reference the description of the fireplace 10, grill bracket assemblies 136 and the enclosed or partially enclosed fireplace described above, and more specifically the description of the fireplace 10, grill bracket assemblies 136 and the description of the shielding means 220 and its related members. In this embodiment, the cover 20 is utilized to at least partially seal the fire chamber. This advantageously allows the user to control heat generation by adjusting the air into the heat source. The cover 20 is generally configured in the same geometric configuration as the base pan assembly 18 and screen assembly 22 described above. The top or cover 20 is adapted to cover the screen panels 74 and the smoker assembly, described in greater detail below, allowing for a compact unit which simplifies handling and storage of the assemblage.

The cover 20, as illustrated in one embodiment in the drawings of figures, is configured to have substantially the same configuration as the screen assembly described herein so as to overlay the top portion 80 of the screen panels 74. In one embodiment, as illustrated in the drawings of figures, the cover 20 has raised or sloped side panels 280 which adjoin a substantially flat top portion 282 which also includes a handle bracket assembly 284 positioned substantially in the center of the top portion 282. The handle bracket assembly 284 has a flat portion 286 with a pair of apertures for attaching the handle bracket assembly 284 to the top portion of the cover 282. Extending from the flat portion 286 are a pair of spaced-apart, outwardly extending arms 288, each having a through hole positioned close to and inward from the end of the arm 288. Attached to the outwardly extending arms 288 is a handle 290. The handle can be attached to the outwardly extending arms 288 using screws, bolts, rivets or a combination thereof. The handle can be fabricated from any non-heat or low heat conductive materials, such as, wood, ceramic, stone and the like, but wood is preferred.

At the base of the side panels 280 is an outwardly disposed flange 132 having at least one alignment hole 287 for registering the joining of a second mating flange 292 to the outwardly disposed flange 132, The second mating flange 292 is a mirror image to the first mating flange 34 on the base pan assembly 18 in that the vertical alignment member 42 is downwardly facing to secure the cover 20 to the top portion 80 of the screen frame member 78. In a preferred embodiment, the cover 20 has an air portal 134, and preferably an adjustable air portal 134, having a means for adjusting and controlling air infiltration into the unit. Such air adjusting means are well know in the art and typically include a plate moveably fastened over an opening in the cover 20 so that during use the plate is opened the desire amount to control smoke exhaust and heat generation.

In one embodiment, in use the grill bracket assembly 136 is inserted into the fire chamber as while holding the handles 162. The pin means 146 is inserted into a predetermined first elevation adjustment slot 110 on the interior panel connector 90 so that the top portion 140 of the grill height adjust members 138 is flush with the top portion 80 of the frame member 78. A corresponding second elevation adjustment slot 144 on the grill bracket assembly 136 is aligned with the pin means 104 on the upper portion 98 of the interior panel connector 90. The two pair of aligned pin means 146 and 104 are then inserted into the mating elevation slots 110 and 144, respectively. The grill bracket assembly 136 is then pushed downwardly to lock the respective pin means 146 and 104 into the mating elevation slots 110 and 144, respectively. The grill bracket assembly 136 is now locked into the screen assembly 22. The cover 20 is placed on the top portion of the grill bracket assemblies 136 so that the vertical alignment members 42 are aligned with the screen frame member 78. Air intake to the fire chamber is controlled by adjusting the position of the vent cover members 254 on the shielding means 220 to expose or close the air holes 240. The top air portal 134 on the cover is then opened to a desired amount to control the heat generated by the heat source, such as wood or charcoal.

In another embodiment, in use the grill bracket assembly 136 is inserted into the fire chamber while holding the handles 162. The pin means 146 is inserted into a predetermined first elevation adjustment slot 110 on the interior panel connector 90 so that the top portion 140 of the grill brackets extend above the top portion 80 of the frame member. A corresponding second elevation adjustment slot 144 on the grill bracket assembly 136 is aligned with the pin means 104 on the upper portion 98 of the interior panel connector 90. The two pair of aligned pin means 146 and 104 are then inserted into the mating elevation slots 110 and 144, respectively. The grill bracket assembly 136 is then pushed downwardly to lock the respective pin means 146 and 104 into the mating elevation slots 110 and 144, respectively. The grill bracket assembly 136 is now locked into the screen assembly 22. The cover 20 is placed on top of the grill bracket assemblies 136 so that the upper grill shelf 148 is covered by the cover 20. When used in this manner it is possible for a second cooking grate to be utilized as a warming tray.

Smoker Adaptor

In another embodiment of the present invention, the fireplace 10 can be easily converted to and utilized as a meat smoker. Referring to FIGS. 1-12 and FIG. 14 the first meat smoker embodiment incorporates by reference the description of the closed grill embodiment above and further includes a smoker adaptor assembly 300 positioned between the cover 20 and screen assembly 22.

The smoker adaptor assembly 300 is adapted to be used in conjunction with the closed grill configuration of the present invention. The smoker adaptor assembly 300 has a plurality of substantially flat panels 302 joined together to form a geometric configuration that substantially matches the configuration of the base pan assembly 18 and the screen assembly 22 so that the cover 20 can also be utilized as a top for the smoker assembly 300. Each smoker panel 302 has a substantially planar face desirably having less than 20 percent of the surface area open, and preferably less than 2 percent of the surface area open and more preferably the planar face is substantially solid and contains no void area. Each smoker panel 302 has a top portion 304, a bottom portion 306, a left lateral side 308 and right lateral side portion 310. At least one smoker panel bottom portion 306 includes at least one and preferably two tab means 312. Preferably, at least two smoker panels 302 include at least one and preferably two tab means 312. Affixed to the bottom portion 306 is a third mating flange 314, that is similar to the second mating flange 292 discussed above for the cover 20. The third mating flange 314 includes at least one, and preferably at least two slots 316 per side and also includes a vertically-oriented alignment member 318 on at least one side, and preferably at least two sides, the purpose of each being described in greater detail below. The third mating flange 314 is aligned with the bottom portion 306 of the panel 302 by inserting the tabs 312 into the slots 316 in the third flange 314. The third flange 314 can be secured to the bottom portion 306 of each panel preferably by using a continuous weld or an intermittent spot weld. The interrelations of the vertical alignment member 318 to the top portion 80 of the screen panel frame 78 allows the user to remove as well as (re-)mount the smoker assembly 300 onto the screen assembly 22 and retain the two assemblies in secure alignment. Generally, the smoker assembly 300 has a height of from about 3 inches to about 24 inches, preferably from about 4 inches to about 18 inches, and more preferably from about 6 inches to about 12 inches, as determined from the bottom of the third flange 314 to the top 304.

The smoker panels 302 are joined together by a plurality of multi-component vertically-oriented panel connectors, which include an interior connector 320 and an exterior connector 322. The exterior connector 322 is preferably stamped and formed at an appropriate angle depending upon the configuration of the fireplace, for example, 3 sides—60 degrees, 4 sides—90 degrees and so forth. In the embodiment illustrated in the drawings of figures, i.e., a hexagonal configuration, the interior and exterior panel connectors 320 and 322 are bent at an angle of about 120°.

The exterior connector 322 includes at least one, preferably two fifth apertures 324, and more preferably a plurality of fifth apertures 324 positioned in a top and bottom portions of the exterior connector 322. Desirably, the fifth apertures 324 are in registration with sixth apertures 326 in the smoker panels 302, preferably the sixth apertures 326 are in the top and bottom portions 304 and 306, respectively, and adjacent to the left and right sides 308 and 310, respectively. The smoker panels 302 and the exterior connector 322 may be screwed, riveted, welded, bolted or otherwise joined together, preferably the two members 302 and 322 are fastened together using a plurality of nuts and bolts.

The interior panel connector 320 is desirably a stamped or laser cut one-piece construction and is bent at an angle similar to that of the exterior panel connector 322. The interior panel connector 320 includes a top portion 328 and a distal lower portion 330, each portion having a pair of "L" shaped flat extensions with a seventh aperture 332 in an end piece. The seventh aperture 332 is adapted to be in registration with an eighth aperture 334 in the smoker panel member 302 so that the interior panel connector 320 and smoker panel member 302 can be joined by screwing, bolting or riveting together. It is to be understood that the terms "bolt" "bolted" and "bolting" in all embodiments described herein further includes a means for securing the bolt such as a nut or integral threads cut into the connecting members so that the bolt can securely fasten the described parts together. An important feature of the present invention is that the exterior panel connector 322 and the interior panel connector 320 are not connected or joined utilizing the same apertures in the smoker panel member 302.

The interior panel connectors 320 include a plurality of evenly-spaced fourth elevation adjustment slots 336. The fourth elevation adjustment slots 336 are in a juxtaposed paired configuration and arranged from the top portion 328 to a predetermined position toward the lower portion 330. The fourth elevation adjustment slots 336 have a generally modified "T" configuration for adjustably engaging and securing a mating pin means attached to a cooking grate adaptor bracket assembly described in greater detail below.

The smoker assembly 300 includes at least one handle means 338 attached to at least one panel 302. Desirably, when the smoker assembly 300 is configured to have five (5) or more sides, the handle means 338 is attached to at least two of the panels 302. The handle means 338 can be attached to the panels 302 by any method known for such joining purposes, such as screwing, bolting, riveting, welding or combinations thereof. The handle means 338 is fabricated from a material that is sufficiently strong to allow the user to install and remove the smoker assembly 300 prior to use, during use, or after use and be capable of withstanding the heat conducted to the handle means 338 and desirably is constructed similar to the handle means 36 attached to the side of the base member 24 described above. The handle means 338 includes a pair of outwardly extending arms 340 approximately 4 to 10 inches long and having a gripping means 342 attached at or proximate to the terminus of the arms. The gripping means 342 can be fabricated from any suitable material including non or low heat conductive material, such as wood, ceramic, metal or combinations thereof. In one embodiment, the terminus of the arms 340 includes a hole and the gripping means 38 is made from a metal pipe welded to the arms 340 so that the hole in the arm 340 is aligned with the pipe void to allow air communication through the gripping means 38.

The smoker assembly 300 can include a temperature sensor 344 inserted in one of the smoker panels 302.

Figure 11:
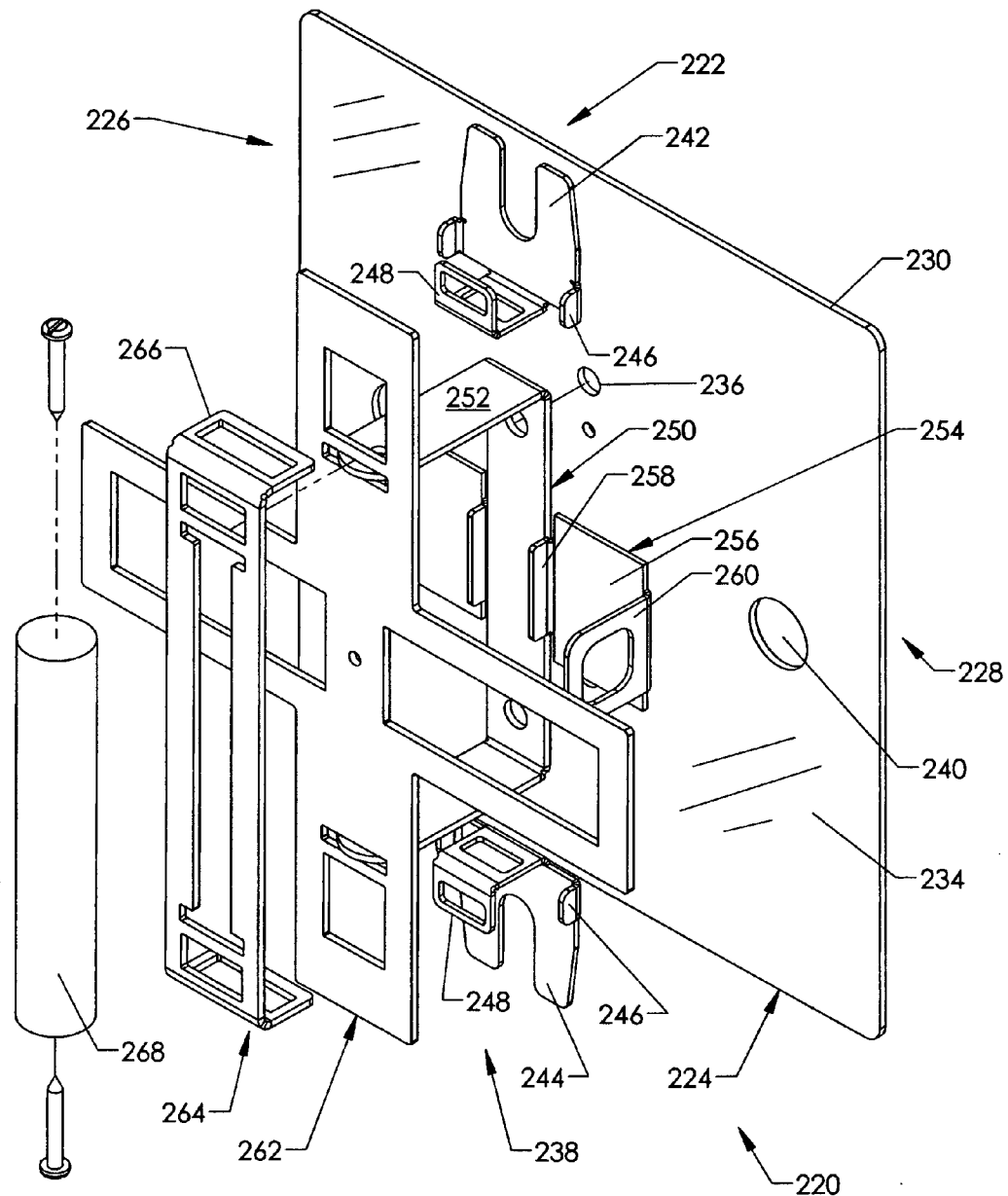
FIG. 11 is an exploded view of an external deflector or shield.
Figure 12:
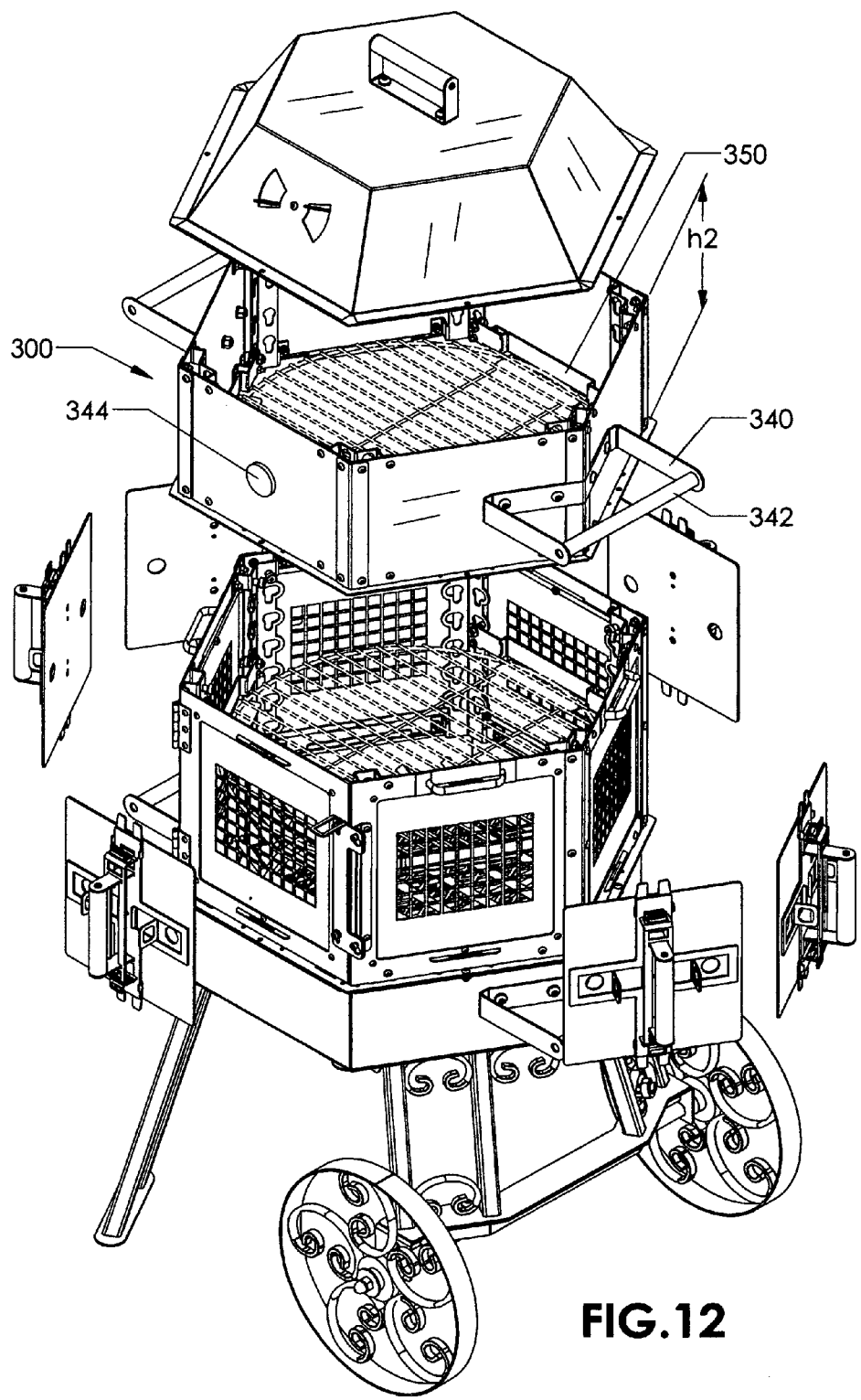
FIG. 12 is a is a partially exploded view of another cooker embodiment wherein at least one of the panels are covered by at least one external deflector or shield, and on top of the covered fireplace panels is a grill-top smoker assembly.
Figure 12A:
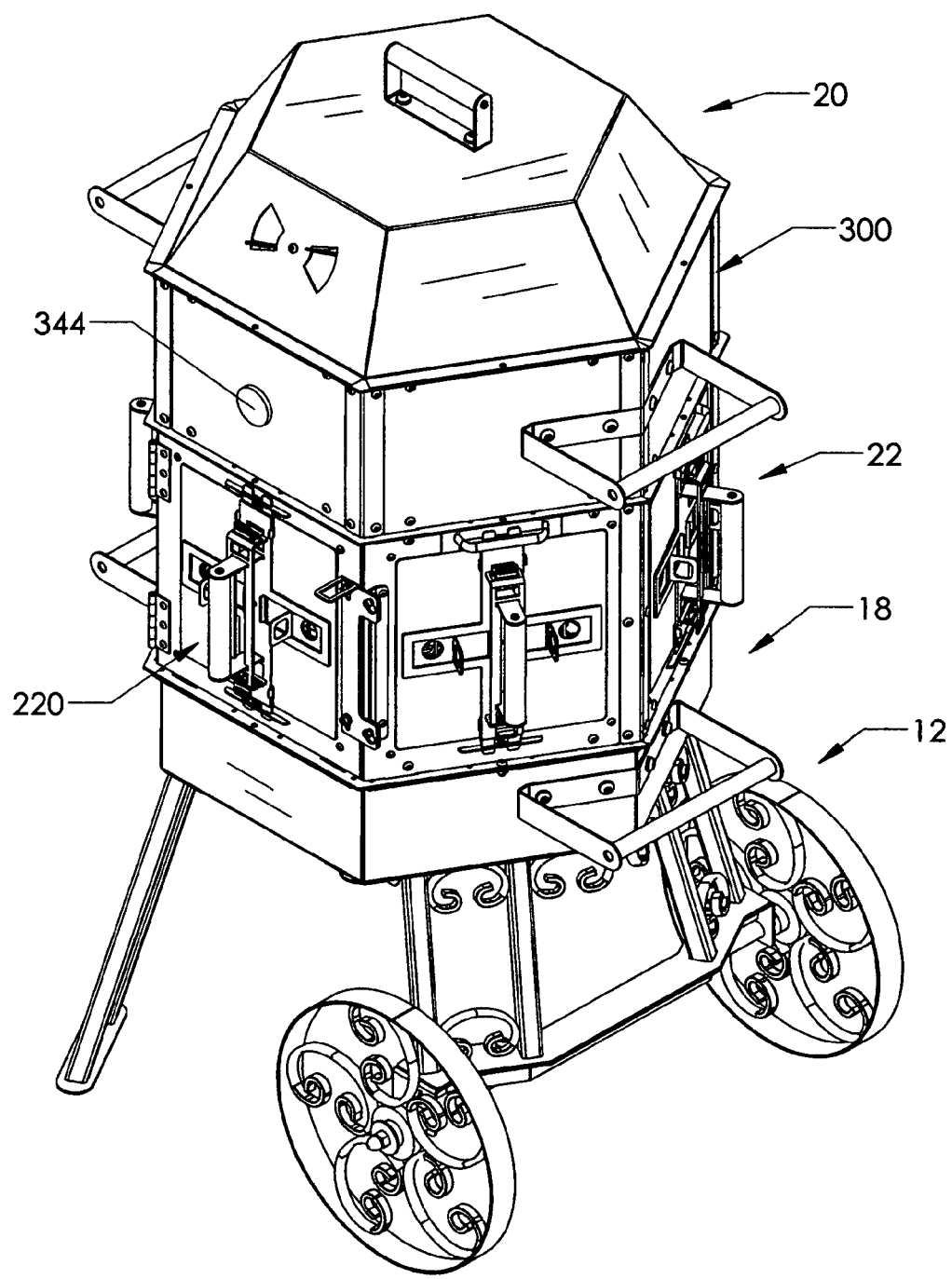
FIG. 12A is an isometric view of the embodiment of FIG. 12 illustrating using a plurality of removable, external deflectors or shields to advantageously allow control of air infiltration to the heat source, thereby regulating the heat generation for a more even and predictable cooking temperature of the smoker assembly.
Figure 12B:
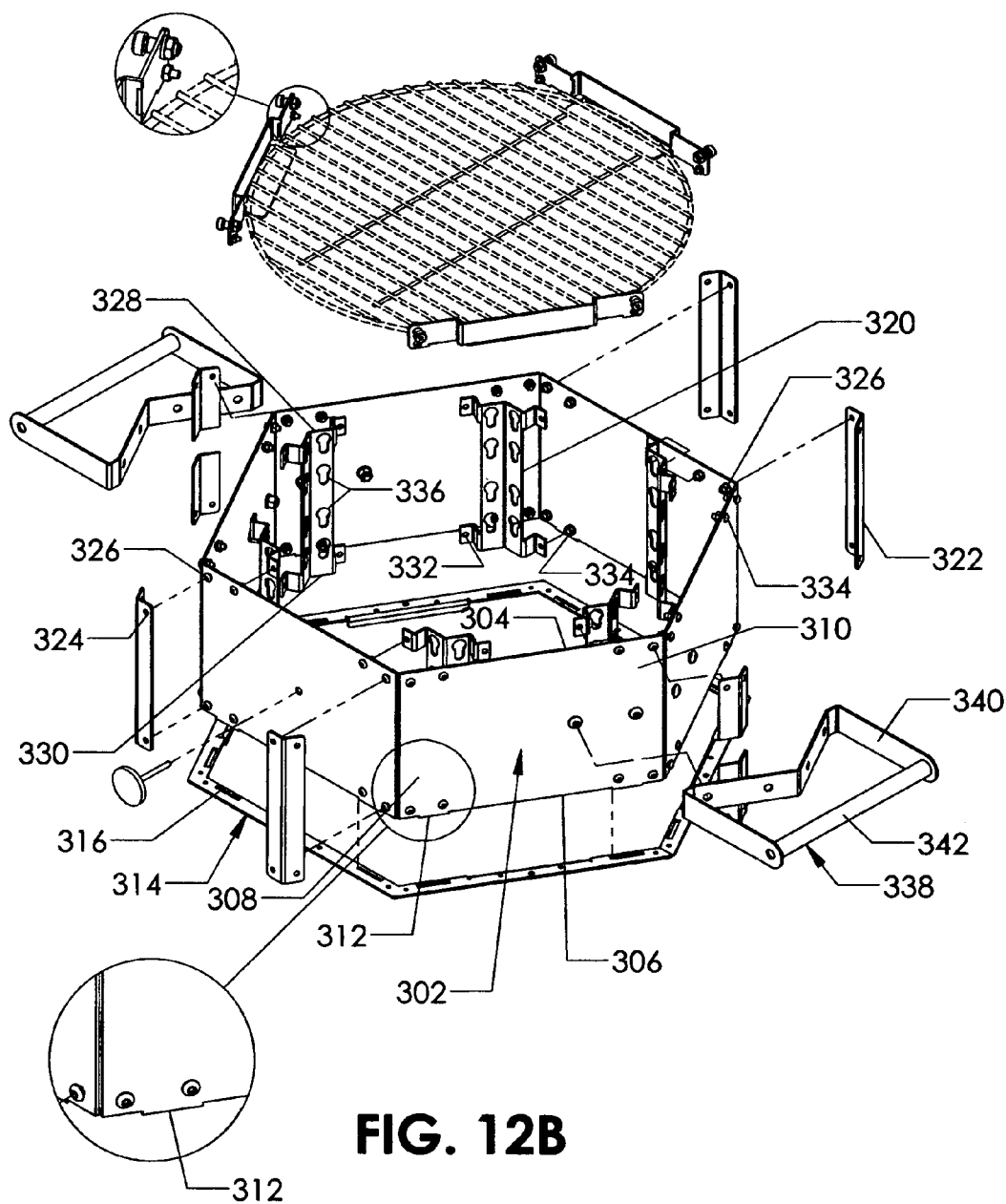
FIG. 12B is an exploded view of the grill-top smoker assembly.
Figure 12C:
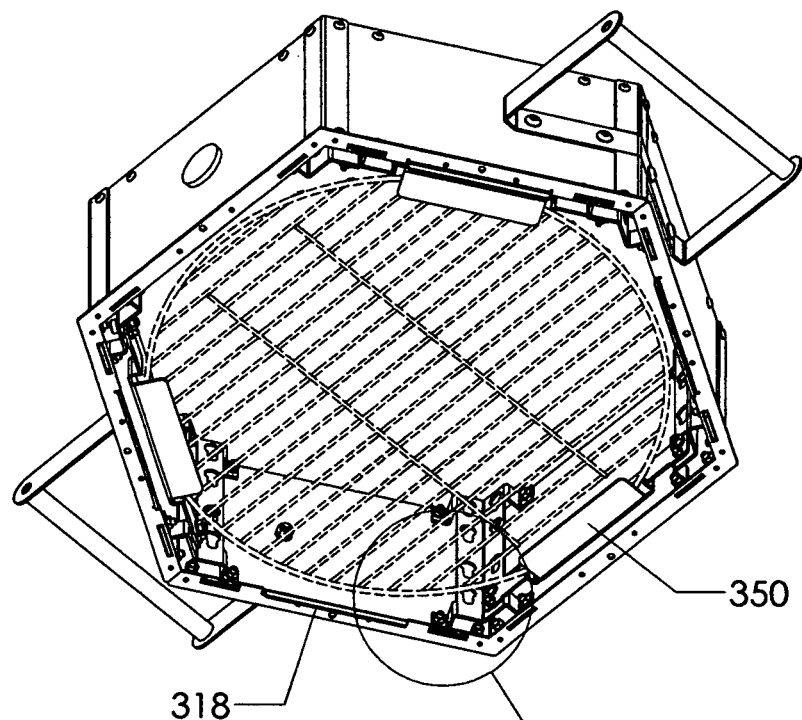
FIG. 12C is bottom plan view of the grill-top smoker assembly.
Figure 12D:
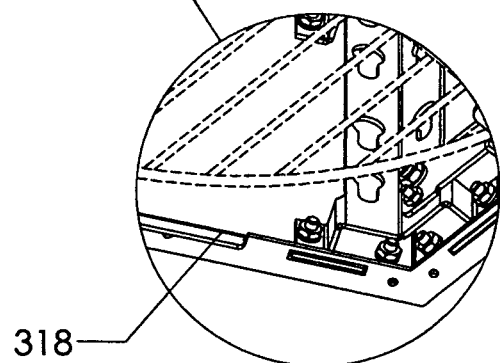
FIG. 12D is an enlarged view of a portion of FIG. 12C.
Figure 14:
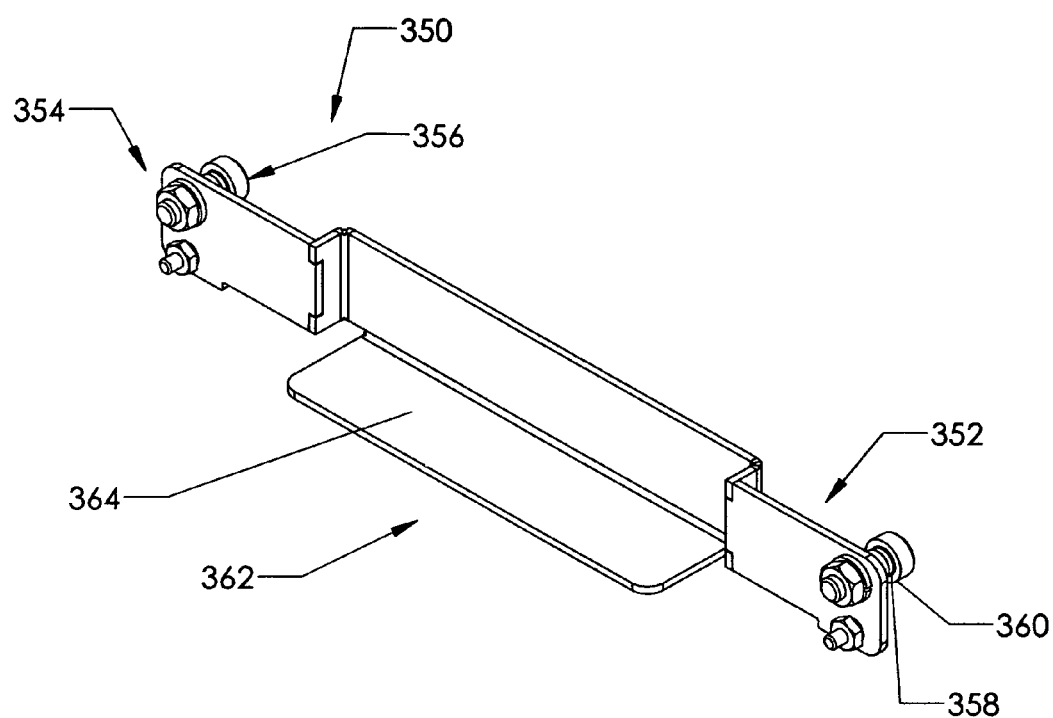
FIG. 14 is an enlarged view of a cooking grate holding bracket that is utilized in the smoker configuration of FIGS. 12-13.

Referring to FIGS. 11, 12 and 14, the smoker assembly 300 includes at least one, and preferably at least two and more preferably three cooking grate adaptor bracket assembles 350. The grate adaptor bracket assembly 350 has a first end 352 and a spaced apart second end 354, each end having a pin means 356 for engaging the elevation adjustment slots 336 and 110 in the interior panel connector 320 and 90. Pin means 356 has a relatively smaller neck portion 358 and a relatively larger head portion 360 connected to the neck portion 358. The pin means 356 are similar to the pin means 104 described above except the pin means 356 projects back toward the panel member 302 whereas the pin means 104 described above projects inwardly toward the fire chamber.

Positioned between and joined to the first and second ends 352 and 354, respectively, is a grate support shelf 362 The grate support shelve 362 is generally configured in the shape of an "L" and appropriately sized so that a typical circular cooking grate, not part of the invention, may be utilized in the either the open grill embodiment, closed grill embodiment and the smoker embodiment of the present invention. The grate support shelve 362 has a ledge portion 364 having a length of from 0.5 of an inch (1.25 cm) to about 3 inches (7.5 cm), preferably a length of from about 0.75 of an inch (2 cm) to about 2 inches (5 cm), and more preferably a length of from about 1 inch (2.54 cm) to about 1.5 inches (3.8 cm). As illustrated in FIG. 14, the grate support shelf 362 optionally has a slight outward offset relative to the first and second ends 352 and 354, respectively.

In use, the smoker adaptor assembly 300 is positioned on top of and interlocked with the screen assembly 22 as described in the closed grill embodiment above. The pin means 356 on the cooking grate adaptor brackets 350 are in inserted and locked into the height adjustment slots 336 of the interior panel connector 320. A cooking grate is then placed on the grate support shelf 362 and the items for smoking/cooking are then placed on the cooking grate. The smoker adaptor assembly 300 is then placed on top of the screen assembly 22. The cover 20 is then placed on top of the smoker adaptor assembly.

Alternatively, the smoker adaptor assembly 300 can be positioned on top of and interlocked with the screen assembly 22 after the cooking grate adaptor brackets 350 are in inserted and locked into the height adjustment slots 336 of the interior panel connector 320 but prior to placement of the items for smoking/cooking are placed on the cooking grill.

The temperature is controlled by managing air intake to the fire chamber by adjusting the position of the vent cover members 254 on the shielding means 220 to expose or close the air holes 240. The top air portal 134 on the cover is then opened to a desired amount to control the heat generated by the heat source, such as wood or charcoal.

Smoker

In another embodiment, the present invention can be utilized as a enclosed smoker. Referring to FIGS. 1-3, 13 and 14, a smoker assembly is depicted generally as 370. The smoker assembly 370 includes: a carriage assembly 12 having a pair of wheels 14 and stationary members or legs 16 for stabilizing the smoker 370 as a whole; a bottom or base pan assembly 18 for holding a heat source, the pan assembly being attached to the carriage assembly 12; a top cover 20; and a smoker body 372 positioned between the bottom pan assembly 18 and top cover 20 being adapted to removably engage the bottom pan assembly 18. The carriage assembly 12, base pan assembly 18 and the cover 20 are the same as described above in one or more of the previously presented embodiments of the present invention, the description of these respective assemblies being incorporated herein for brevity.

It is to be understood that particular configuration of the smoker assembly 370 described herein is illustrated as a hexagonal design is for purpose of example only. One skilled in the art will understand that other suitable configurations having from 3 to 20 sides may be utilized in the present invention.

The smoker body 372 has a plurality of substantially flat panels 374 connected together to form a geometric configuration that substantially matches the configuration of the base pan assembly 18 and the cover 20 so that these two assemblies of the fireplace 10 can also be utilized for the smoker assembly 370. The smoker panels 374 have a top portion 376, a bottom portion 378, a left lateral side 380 and right lateral side portion 382. Excepting the door panel assembly(s) 386, each bottom portion 378 further includes at least one and preferably two tab means 384 that are in registration with the slots 40 in the first mating flange 34 of the base pan assembly 18. The interrelations of the tab means 384 with the slots 40 in combination with the vertical alignment member 42 on the first mating flange 34 allows the user to remove as well as mount the smoker body 372 onto the base pan assembly 18 and retain the two assemblies in secure alignment. Generally, the smoker body 372 has a height of from about 8 inches to about 36 inches, preferably from about 12 inches to about 24 inches, as determined from the bottom portion 378 to the top portion 376.

The smoker panels 374 are joined together by a plurality of multi-component, vertically-oriented panel connectors, which include an interior connectors 388 and an exterior connectors 390. The exterior connector 390 is preferably stamped and formed at an appropriate angle depending upon the configuration of the fireplace, for example, 3 sides—60 degrees, 4 sides—90 degrees and so forth. In the embodiment illustrated in the drawings of figures, i.e., a hexagonal configuration, the interior and exterior panel connectors 388 and 390, respectively, are bent at an angle of about 120°.

The exterior connector 390 includes at least one first aperture or hole 392, preferably the exterior connector 390 includes at least two first apertures 392, and more preferably a plurality of first apertures 392 positioned equidistant along the exterior panel connector 390 and preferably at least one first aperture in a top and bottom portion of the exterior connector 390. Desirably, the first apertures 392 are in registration with a second aperture 394 in the smoker panels 374, preferably the second apertures 394 are positioned equidistant along the smoker side portions 380 and 382 and more preferably at least one second aperture is adjacent to the top portion 376 and bottom portion 378. The smoker panels 374 and the exterior connectors, 390 may be joined together by using screws, rivets, weld, bolts or otherwise joined together, preferably the two members 374 and 390 are fastened together using a plurality of nuts and bolts.

The interior panel connector 388 is desirably a stamped or laser cut one-piece construction and is bent at an angle similar to that of the exterior panel connector 390. The interior panel connector 388 includes a top portion 396 and a distal lower portion 398, each portion having a pair of "L" shaped flat extensions with a third aperture 400 in an end piece. The third aperture 400 is adapted to be in registration with a forth aperture 402 in the smoker panel member 374 so that the interior panel connector 388 and smoker panel member 374 can be joined by screwing, bolting or riveting together. It is to be understood that the terms "bolt" "bolted" and "bolting" in all embodiments described herein further includes a means for securing the bolt such as a nut or integral threads cut into the connecting members so that the bolt can securely fasten the described parts together. An important feature of the present invention is that the exterior panel connector 390 and the interior panel connector 388 are not connected or joined utilizing the same apertures in the smoker panel member 374. The importance of this will become better understood in the description below.

The interior panel connectors 388 include a plurality of evenly-spaced elevation adjustment slots 404. The elevation adjustment slots 404 in each interior panel connector 388 are in a juxtaposed paired configuration and arranged from the top portion 396 to a predetermined position toward the bottom portion 398. The elevation adjustment slots 404 have a generally modified "T" configuration for adjustably engaging and securing a mating pin means 356 attached to the cooking grate adaptor bracket assembly 350 described in greater detail above.

The smoker assembly 370 includes at least one handle means 406 attached to at least one panel 374. Desirably, when the smoker assembly 370 is configured to have five (5) or more sides, the handle means 406 is attached to at least two adjacent panel members 374. The handle means 406 can be attached to the panels 374 by any method known for such joining purposes, such as screwing, bolting, riveting, welding or combinations thereof. The handle means 406 is fabricated from a material that is sufficiently strong to allow the user to install and remove the smoker body 372 prior to use, during use, or after use and be capable of withstanding the heat conducted to the handle means 406. The handle means 406 is desirably constructed similar to the handle means 36 attached to the side of the base member 24 described above. The handle means 406 includes a pair of outwardly extending arms 408 approximately 4 to 10 inches long and having a gripping means 410 attached at or proximate to the terminus of the arms. The gripping means 410 can be fabricated from any suitable material including non or low heat conductive material, such as wood, ceramic, metal or combinations thereof. In one embodiment, the terminus of the arms 408 includes a hole and the gripping means 410 is made from a metal pipe welded to the arms 408 so that the hole in the arm 408 is aligned with the pipe void to allow air communication through the gripping means 410.

The smoker assembly 370 can include a temperature sensor 412 inserted, desirably in one of the smoker door panels 414.

The smoker assembly 370 further includes at least one door panel assembly 386, which includes a substantially flat door panel member 414 secured to a door frame member 416 by a pair of hinge means 418. The door panel assembly 386 further includes a latch assembly 420 attached to the door panel member 414 for securing the door panel member 414 in a closed position.

The door panel member 414 is substantially flat having a substantially rectangular shape and dimensionally resides inside of the door frame member 416. Fastened to a first lateral side of the door panel member 414 are one-half of a pair of hinge means 418. The hinge means 418 are fastened to the door panel member 414 using screws, bolts, rivets or combinations thereof, and desirably are disposed proximate to the top portion and bottom portion of the door panel member 414.

Positioned on the opposing second lateral side of the door panel member 414, relative to the hinge means 418, is a latch assembly 420. The latch assembly 420 includes a latching plate 422 movably connected to the lateral side portion of the door panel member 414. The latching plate 422 has an upper section and a lower section having two vertically elongated slots 424, wherein the latching plate 422 is movably connected to the door panel member 414 by aligning the vertically elongated slots with a pair of loosely mounted bolts in the door panel member 414. On a portion of the latching plate 422, and preferably the top portion, is a handle 426 for moving the latching plate 422 in an up and down motion for opening and closing the door panel member 414. The latching plate 422 includes a pair of inverted "T" shaped apertures or slots 428 that are adapted to securely engage a pair of latch pins 430 affixed to the door frame member 416 described below.

The door frame member 416 is desirably slightly dimensionally larger than the door panel member 414 so as to circumferentially surround the door panel member 414. The door frame member 416 has a top portion 432, a bottom portion 434, a left side portion 436 and a right side portion 438. The top and bottom portions 432 and 434 includes a fourth aperture 402 for securing the interior panel connector 388 to the door frame member 416. The left and right sides 436 and 438, respectively include a plurality of second apertures 394 for affixing the exterior panel connector 390 to the door frame member 416. The second half of the hinge means 418 is affixed to the door frame member 416 to support the door panel member 414 and allow the door panel member 414 to freely swing outwardly, i.e., away from the fire chamber, and out of the way when desired by the user. Latch pins 430 are affixed on the adjacent interior panel connector 390. The latch pins 430 engage the latching plate slots 428 for securing the door panel member 414 in a closed orientation when desired. In a preferred embodiment, the smoker of the present invention includes two door panel assemblies on opposing sides of the smoker body 372. This allows the user to easily add, remove and inspect food items as to the degree of preparedness without having to place their hand or arm into the smoker body 372 when in use. Additionally, this arrangement allows the user to add fuel and/or smoking chips to the heat source without having to place their hand or arm into the smoker body 372 when in use.

At least one of the smoker panels 374 includes an adjustable air portal 440 having a means for adjusting and controlling air infiltration into the unit when a fire is present. Such air adjusting means are well know in the art and typically include a plate moveably fastened over an opening in the smoker panel 374 so that during use the plate is opened the desire amount to control heat generation.

The smoker assembly 370 further includes a cover assembly 20 as described above which, in combination with the air portal 440, control the heat generation and temperature inside the smoker body 372.

Figure 13:
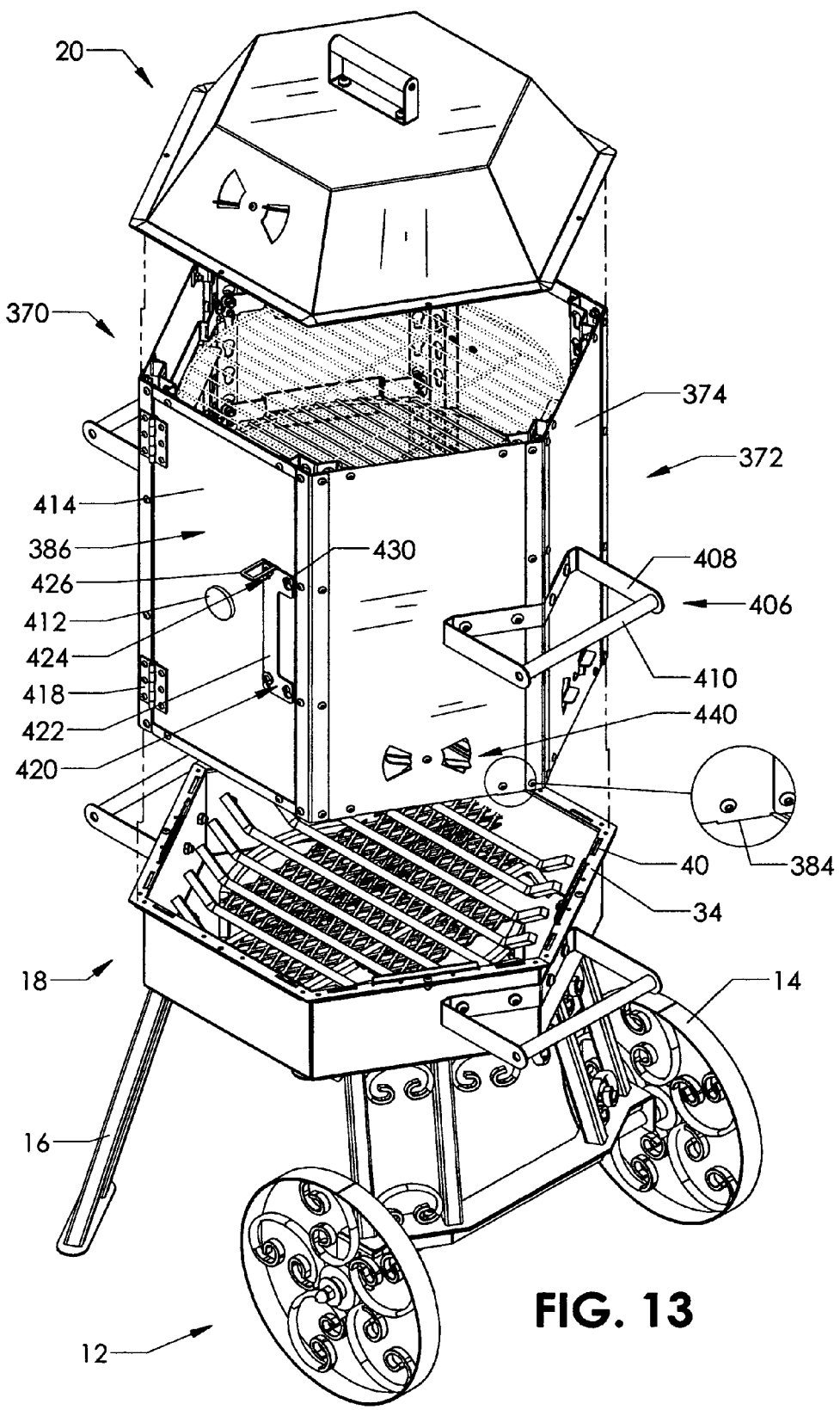
FIG. 13 is a partial exploded view of another embodiment of the present invention used as second smoker.
Figure 13A:
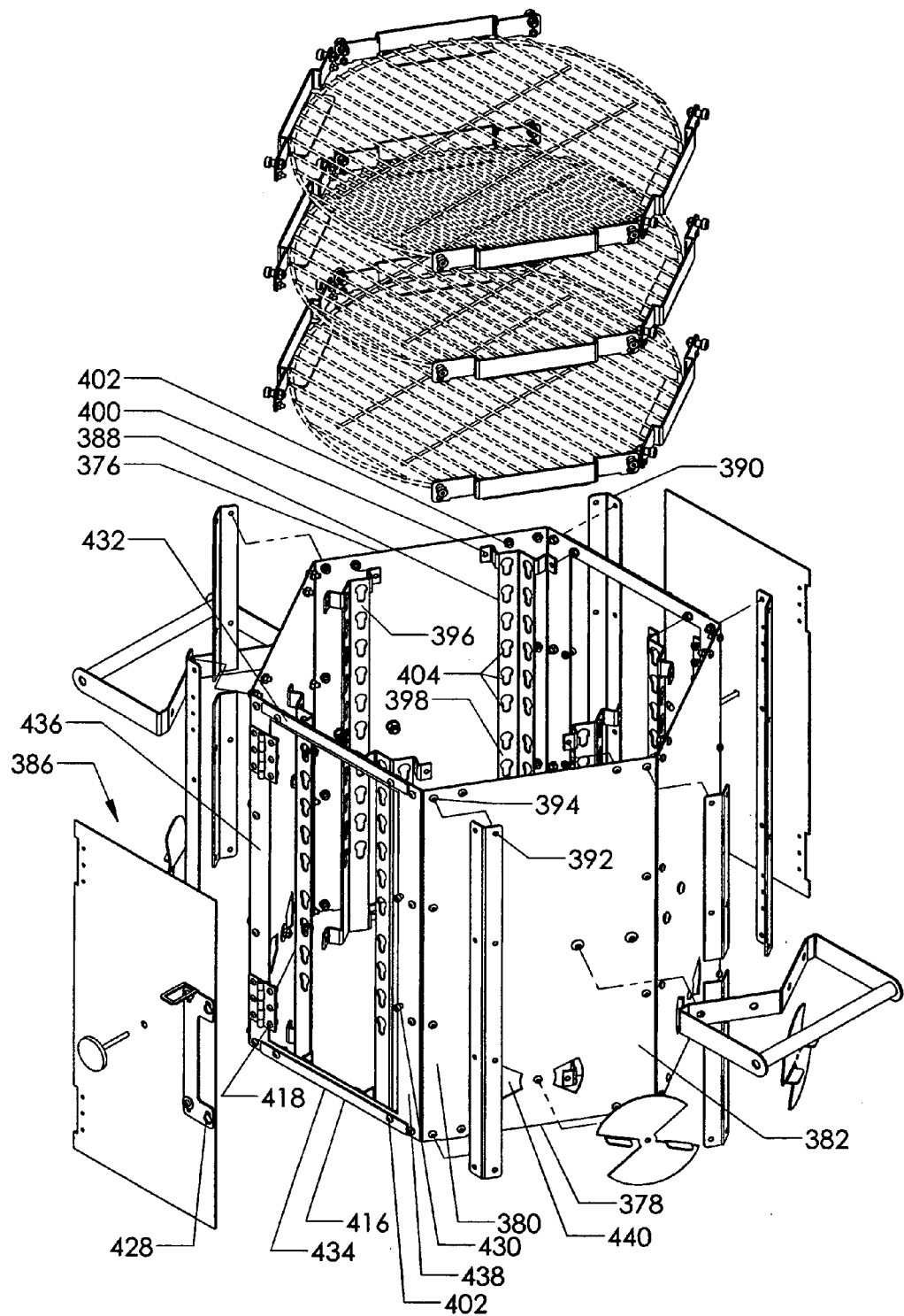
FIG. 13A is an exploded view of the second smoker assembly of FIG. 13.

Referring to FIGS. 13 and 14, the smoker assembly 370 includes at least two, and preferably at least three and more preferably four cooking grate adaptor bracket assemblies 350 described above and is incorporated herein by reference. Height positioning and use of the cooking grate adaptor bracket assembles 350 is similar to that described above for the smoker adaptor assembly 300 and is also incorporated herein by reference.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

What is claimed is:

1. A portable outdoor fire-containment assembly comprising:
   a. a carriage assembly having a pair of rotatable wheels and at least one leg member;
   b. a base pan assembly comprising a bottom affixed to said carriage assembly; side members projecting upward from said bottom to define a space for supporting and burning a solid combustible fuel source, and a first mating flange attached to an upper portion of said side members, said first mating flange having a first slot; and
   c. a screen assembly removably positioned onto and supported by said base pan assembly, said screen assembly comprising:
      i) a plurality of screen panel members, said screen panel members having at least one bottom tab means for engaging said first slot in said first mating flange;
      ii) at least one door panel member having a first portion of a hinge means affixed to an adjacent screen panel member and a second portion affixed to said door panel member, and a latching means oppositely disposed from said hinge means;
      iii) a plurality of vertically-oriented exterior panel connectors affixed to and joining adjacent screen panel members together and holding said screen assembly in an upright position; and
      iv) a plurality vertically-oriented interior panel connector affixed to and joining adjacent screen panel members together, wherein said interior panel connector includes a plurality of first pin means and first elevation adjustment slots.

2. The portable outdoor fire-containment device of claim 1 wherein said carriage assembly includes a pair of leg members, said leg members being affixed to said base pan assembly.

3. The portable outdoor fire-containment device of claim 2 wherein said leg members each comprise a sole plate for contacting the ground, a top plate affixed to said base pan assembly and a plurality of vertical support members between and affixed to said sole plate and said top plate.

4. The portable outdoor fire-containment device of claim 1 wherein said base pan assembly has from 3 to 20 side members.

5. The portable outdoor fire-containment device of claim 1 wherein said base pan assembly has six sides.

6. The portable outdoor fire-containment device of claim 1 wherein said first mating flange further comprises at least one vertical alignment member for securing said screen panel assembly in a removably fixed relation to said base pan assembly.

7. The portable outdoor fire-containment device of claim 1 wherein at least two of said screen panel members include a handle means fixedly attached for lifting and adjusting said screen assembly on said base pan assembly.

8. The portable outdoor fire-containment device of claim 1 wherein said door panel member latching means comprises a latching plate movably affixed to said door panel member, said latching plate having at least one inverted "T" slot for removably engaging a latch pin affixed to an adjacent screen panel member.

9. The portable outdoor fire-containment device of claim 1 further comprising:
   d. a grill bracket assembly comprising:
      i) a pair of spaced-apart grill height adjustment members each having second elevation adjustment slots and second pin means;

ii) at least one grill shelf disposed between and joining said pair of spaced-apart grill height adjustment members; and
iii) a handle means connected to an upper portion of said spaced-apart grill height adjustment members,
wherein said second pin means removably engage said first elevation adjustment slots and said first pin means removably engages said second elevation adjustment slots to secure said grill bracket assembly to said screen assembly and define a shelf for supporting a cooking grate.

10. The portable outdoor fire-containment device of claim 9 including at least three grill bracket assemblies.

11. The portable outdoor fire-containment device of claim 1 further comprising:
d. a rotisserie bracket assembly comprising:
i) a vertically-oriented height adjustment member having a plurality of second elevation adjustment slots arranged in a columnar format and adapted to engage said first pin means, and a second pin means located in a bottom portion of said height adjustment member;
ii) a rotisserie mounting plate connected to said height adjustment member, wherein said rotisserie mounting plate includes a means for mounting a rotisserie device to said rotisserie bracket assembly; and
iii) a handle means connected to said rotisserie mounting plate for mounting and removing the rotisserie bracket assembly from said screen assembly,
wherein said second pin means removably engage said first elevation adjustment slots and said first pin means removably engages said second elevation adjustment slots for securing said rotisserie bracket assembly to said screen assembly to support and secure the rotisserie assembly to said screen assembly.

12. The portable outdoor fire-containment device of claim 11 including at least two rotisserie bracket assemblies.

13. The portable outdoor fire-containment device of claim 1 further comprising a grill support assembly, said grill support assembly comprising:
a) a pair of spaced-apart, vertically-oriented grill height adjustment members having a top portion and a bottom portion, each member having a plurality of elevation adjustment slots and pin means positioned on said bottom portion;
b) at least one grill shelf disposed between and joining said pair of spaced-apart grill height adjustment members; and
c) an arm member extending from said top portion; and
d) a handle bracket assembly attached to said arm member, wherein said handle bracket assembly includes a bracket member affixed to said arm member and a handle member attached to said bracket member.

14. The portable outdoor fire-containment device of claim 1 further comprising a rotisserie bracket assembly, said rotisserie bracket assembly comprising:
a) a vertically-oriented height adjustment member having a plurality of elevation adjustment slots arranged in a columnar format and a pin means extending from said height adjustment member and located in a bottom portion of said height adjustment member;
b) a rotisserie mounting plate connected to said height adjustment member, wherein said rotisserie mounting plate includes a means for mounting a rotisserie device to said rotisserie bracket assembly; and
c) a handle means connected to said rotisserie mounting plate for mounting and removing the rotisserie bracket assembly from said screen assembly.

15. The rotisserie bracket assembly of claim 14 further comprising an ear portion extending laterally from a top portion of said height adjustment member; a pair of upper and lower extension members positioned between said ear portion and said rotisserie mounting plate and having a first end affixed to said ear portion and a second end affixed to said rotisserie mounting plate.

16. The rotisserie bracket assembly of claim 14 wherein said rotisserie mounting plate includes a plurality of vertically-oriented elongated slots for mounting a rotisserie device.

17. A portable outdoor fire-containment and cooking assembly having from 3 to 20 sides comprising:
a. a carriage assembly having a pair of rotatable wheels and at least one leg member;
b. a base pan assembly comprising: a bottom affixed to said carriage assembly; side members projecting upward from said bottom to define a space for supporting and burning a solid combustible fuel source; and a first mating flange affixed to a top portion of said side members, said first mating flange having on at least one side a first slot and a vertical alignment member extending upwardly;
c. a screen assembly removably positioned on said base pan assembly, said screen assembly comprising:
i) a plurality of screen panel members, said screen panel members comprising a screen member attached to a frame member and wherein at least one screen frame member has at least one bottom tab means for engaging said first slot in said first mating flange;
ii) at least one door panel member having a hinge means affixed to an adjacent screen panel member and a latching means oppositely disposed from said hinge means;
iii) a plurality of vertically-oriented first exterior panel connector affixed to and joining adjacent screen panel members together and holding said screen assembly in an upright position; and
iv) a plurality of vertically-oriented first interior panel connectors affixed to and joining adjacent screen panel members together, wherein said interior panel connector includes a pair of first pin means and a plurality of vertically-oriented first elevation adjustment slots; and
d. a top or cover adapted to be removably affixed to said screen assembly.

18. The portable outdoor fire-containment and cooking assembly of claim 17 wherein said fire-containment and cooking assembly has six sides, wherein said carriage assembly includes a pair of leg members, said leg members each comprise a sole plate for contacting the ground, a top plate affixed to said base pan assembly and a plurality of vertical support members between and affixed to said sole plate and said top plate, said rotatable wheels being affixed to an axle member, wherein said axle member rotatably affixed to a wheel connecting bracket, wherein said wheel connecting bracket is affixed to a rear leg weldment, said rear leg weldment comprising a top flat bar affixed to said bottom of said pan member, a bottom flat bar affixed to said wheel connecting bracket, and a pair of short leg members positioned between and affixed to said bottom flat bar and said top flat bar.

19. The portable outdoor fire-containment and cooking assembly of claim 18 wherein said base pan assembly includes at least one handle means affixed to two adjoining side members, said handle means having a pair of spaced-apart outwardly extending arms relative to said side members and a handle between and affixed to said pair of spaced-apart outwardly extending arms.

20. The portable outdoor fire-containment and cooking assembly of claim 19 wherein said handle means is affixed to said pan side members on a side opposite said rear leg weldment.

21. The portable outdoor fire-containment and cooking assembly of claim 19 wherein said first mating flange includes at least two first slots on each side and at least one vertical alignment member is positioned between said first slots, wherein at least four of said screen frame members have a handle means attached thereto for lifting and adjusting said screen assembly on said base pan assembly, and wherein said door panel member includes a latching means for opening and securing said door panel member in a closed position, wherein said latching means comprises a latching plate movably affixed to said door panel member, said latching plate having at least one inverted "T" slot for removably engaging a latch pin affixed to an adjacent screen panel member.

22. The portable outdoor fire-containment and cooking assembly of claim 18 wherein said a screen member is circumscribed by said screen frame member, said screen member being affixed to said screen frame member by a screen holding means affixed to said screen frame member, said screen frame member having a top portion and a bottom portion, each portion having a substantially centrally positioned opening, said screen holding means further comprising a second tab member extending through said central opening and projecting horizontally from said screen frame member, said second tab member including a second slot.

23. The portable outdoor fire-containment and cooking assembly of claim 22 further comprising:
 e. a grill bracket assembly comprising:
   i) a pair of vertically-oriented, spaced-apart grill height adjustment members each grill height adjustment member having second elevation adjustment slots and second pin means, wherein at least one grill shelf is disposed between and connected to said pair of spaced-apart grill height adjustment members; and
   ii) a handle means connected to an upper portion of said spaced-apart grill height adjustment members, wherein said second pin means removably engage said first elevation adjustment slots and said first pin means removably engages said second elevation adjustment slots for securing said grill bracket assembly to said screen assembly to define a shelf for supporting a grilling screen or grate.

24. The portable outdoor fire-containment and cooking assembly of claim 22 further comprising:
 e. a heat/wind shield assembly comprising:
   i) a cover plate member adapted to cover said screen member and reside inside an inner border of said screen frame member, said cover plate member having an interior facing surface and an exterior facing surface;
   ii) a handle means for grasping said heat/wind shield assembly, said handle means having a flat portion attached to said exterior facing surface of said cover plate and a pair of spaced-apart arm members extending outwardly relative to said exterior facing surface, and a handle attached to and connecting said spaced-apart arm members; and
   iii) means for securing said heat/wind shield means to said screen frame member comprising first and second vertical latch members movably retained by a latch and vent retaining means fastened to said handle flat portion, wherein said first and second latch members engage said second slots on said screen holding means thereby removably affixing said heat/wind shield to said frame member.

25. The portable outdoor fire-containment and cooking assembly of claim 24 wherein said heat/wind shield means further comprises:
   iv) an air controlling means for controlling air into said fire chamber comprising a hole in said cover plate of sufficient dimension for promoting combustion of said fuel source and a vent cover member movably retained by said latch and vent retaining means, wherein said vent cover member is adapted to adjust air into the fire chamber by exposing or occluding said cover plate hole by a predetermined amount.

26. The portable outdoor fire-containment and cooking assembly of claim 25 wherein said latch and vent retaining means comprises an upper portion, a lower portion and two spaced-apart lateral side portions, wherein said upper and lower portions each include a first opening, said first and second latch members each having a first gripping member extending through said first openings, and wherein said lateral side portions each include a second opening, said vent cover having a flat portion and a second gripping member attached to said vent cover flat portion, said second gripping member extending through said second opening, and wherein said latch and vent retaining means retains said first and second gripping means in a moveable relation to said cover plate.

27. The portable outdoor fire-containment and cooking assembly of claim 26 wherein said cover includes a plurality of angled side members and a substantially flat top joined to said side members, at least one of said side members having a vent portal and wherein said top includes a means for grasping and lifting said top or cover from said panel assembly, and wherein said pan assembly and said screen assembly defining a fire chamber for holding and combustion of a solid fuel heat source.

28. The portable outdoor fire-containment and cooking assembly of claim 25 further comprising:
 f. a smoker adaptor assembly wherein said smoker adaptor assembly removably engages said top portion of said screen frame members, said smoker adaptor assembly comprising:
   i) a plurality of smoker panel members, each smoker panel member having a surface area wherein less than about 20 percent of said surface is open, each smoker panel member having a top portion, a bottom portion, and spaced apart lateral side portions, wherein at least one smoker panel member includes a tab means on said bottom portion;
   ii) a plurality of vertically-oriented second exterior panel connectors affixed to and joining adjacent smoker panel members together and holding said smoker adaptor assembly in an upright position;
   iii) a plurality of vertically-oriented second interior panel connectors affixed to and joining adjacent screen panel members together, wherein said interior panel connector includes a plurality of vertically-oriented second elevation adjustment slots;
   iv) a second mating flange having on at least one side a slot for engaging said smoker panel tab mean and a second vertical alignment member extending downwardly, wherein said smoker panel and said second mating flange are fixedly joined together; and v) a handle means affixed to at least one of said smoker panel members for lifting and adjusting said smoker adaptor assembly on said screen panel assembly.

29. The portable outdoor fire-containment and cooking assembly of claim 28 further comprising a cooking grate adaptor bracket, wherein said cooking grate adaptor bracket adjustably and removably engages said vertically-oriented second elevation adjustment slots in said second interior panel connectors.

30. The portable outdoor fire-containment and cooking assembly of claim 29 wherein said cooking grate adaptor bracket includes: a pair of spaced-apart end portions; a third pin means for removably engaging said second elevation adjustment slots affixed to each end portion; and a grate support shelf positioned between and fastened to said spaced-apart ends of the cooking grate adaptor bracket.

31. The portable outdoor fire-containment and cooking assembly of claim 30 wherein said smoker adaptor assembly includes three cooking grate adaptor brackets.

32. A portable outdoor smoker assembly having from 3 to 20 vertically-oriented sides comprising:
  a. a carriage assembly having a pair of rotatable wheels and at least one leg member;
  b. a base pan assembly having a bottom affixed to said carriage assembly and side members projecting upward from said bottom to define a space for supporting and burning a solid combustible fuel source, and a first mating flange affixed to said side members, said first mating flange having a first slot;
  c. a smoker body assembly removably engaging said first mating flange, said smoker body comprising:
    i) a plurality of smoker panel members, each smoker panel member having a surface area wherein less than about 20 percent of said surface is open, each smoker panel member having a top portion, a bottom portion, and spaced apart lateral side portions, wherein at least one smoker panel member includes a tab means on said bottom portion;
    ii) a plurality of vertically-oriented exterior panel connectors affixed to and joining adjacent smoker panel members together and holding said smoker body assembly in an upright position;
    iii) a plurality of vertically-oriented interior panel connectors affixed to and joining adjacent screen panel members together, wherein said interior panel connector includes a plurality of vertically-oriented elevation adjustment slots;
    iv) at least one door panel assembly comprising: a door panel member; a door frame member affixed to at least one of said interior and said exterior panel connectors adjoining an adjacent smoker panel member, said door frame member having spaced-apart first and second lateral side portions, said door frame member circumferentially surrounding said door member; a hinge means having a first portion affixed to a first side portion of said door panel member and a second portion affixed to a first lateral side portion of said door frame member, said hinge means allowing said door panel member to swing outwardly; and a latching means disposed on said second lateral side of said door frame member and movably affixed to said door panel member; and
    v) a handle means affixed to at least one of said smoker panel members for lifting and adjusting said smoker body assembly on said screen panel assembly;
  d. a plurality of a cooking grate adaptor brackets, wherein each cooking grate adaptor bracket adjustably and removably engages said vertically-oriented elevation adjustment slots in said interior panel connectors; and
  e. a top or cover adapted to be removably affixed to said smoker body assembly.

33. The portable outdoor smoker assembly of claim 32 wherein said carriage assembly includes a pair of leg members, said leg members being affixed to said base pan assembly.

34. The portable outdoor smoker assembly of claim 33 wherein said leg members each comprise a sole plate for contacting the ground, a top plate affixed to said base pan assembly and a plurality of vertical support members between and affixed to said sole plate and said top plate.

35. The portable outdoor smoker assembly of claim 32 wherein said rotatable wheels being affixed to an axle member, wherein said axle member rotatably affixed to a wheel connecting bracket, wherein said wheel connecting bracket is affixed to a rear leg weldment, said rear leg weldment comprising a top flat bar affixed to said bottom of said pan member, a bottom flat bar affixed to said wheel connecting bracket, and a pair of short leg members positioned between and affixed to said bottom flat bar and said top flat bar.

36. The portable outdoor smoker assembly of claim 35 wherein said base pan assembly has six sides and said base pan assembly includes at least one handle means affixed to two adjoining side members, said handle means having a pair of spaced-apart outwardly extending arms relative to said side members and a handle between and affixed to said pair of spaced-apart outwardly extending arms, and wherein said handle means is affixed to said pan side members on a side opposite said rear leg weldment.

37. The portable outdoor smoker assembly of claim 32 wherein said first mating flange further comprises at least one vertical alignment member for securing said smoker body assembly in a removably fixed relation to said base pan assembly.

38. The portable outdoor smoker assembly of claim 32 wherein said latching means comprises a latching plate movably affixed to said door panel member, said latching plate having at least one inverted "T" slot for removably engaging a latch pin affixed to an adjacent interior panel connector.

39. The portable outdoor smoker assembly of claim 32 wherein said smoker body assembly comprises two handle means affixed to at least one of said smoker panel members for lifting and adjusting said smoker body assembly on said base pan assembly.

* * * * *